(12) United States Patent
Wu

(10) Patent No.: US 7,227,856 B2
(45) Date of Patent: Jun. 5, 2007

(54) METHOD FOR HANDLING TIMERS AFTER AN RLC RESET OR RE-ESTABLISHMENT IN A WIRELESS COMMUNICATIONS SYSTEM

(75) Inventor: Chih-Hsiang Wu, Taipei Hsien (TW)

(73) Assignee: Innovative Sonic Limited, Tortola (VG)

( * ) Notice: Subject to any disclaimer, the term of this patent is extended or adjusted under 35 U.S.C. 154(b) by 945 days.

(21) Appl. No.: 10/064,747

(22) Filed: Aug. 13, 2002

(65) Prior Publication Data
US 2004/0032851 A1 Feb. 19, 2004

(51) Int. Cl.
*H04J 3/16* (2006.01)
(52) U.S. Cl. .................... 370/346; 370/350
(58) Field of Classification Search .......... None
See application file for complete search history.

(56) References Cited

U.S. PATENT DOCUMENTS

| | | | |
|---|---|---|---|
| 6,363,058 B1 * | 3/2002 | Roobol et al. | 370/310 |
| 6,473,399 B1 * | 10/2002 | Johansson et al. | 370/229 |
| 6,978,413 B2 * | 12/2005 | Han | 714/749 |
| 2001/0029188 A1 | 10/2001 | Sarkkinen et al. | |
| 2002/0042270 A1 * | 4/2002 | Yi | 455/424 |
| 2002/0107019 A1 | 8/2002 | Mikola et al. | |
| 2003/0092458 A1 * | 5/2003 | Kuo | 455/517 |
| 2004/0042491 A1 * | 3/2004 | Sarkkinen et al. | 370/469 |

FOREIGN PATENT DOCUMENTS

WO  WO-01/47206 A2  6/2001

OTHER PUBLICATIONS

3GPP TS 25,322 V3.11.0 (Jun. 2002) 3rd Generation Partnership Project; Technical Specification Group Radio Access Network; Radio Link Control (RLC) protocol specification (Release 1999).
ETSI TS 125 322 V5.1.0; Universal Mobile Telecommunications System (UMTS); Radio Link Control (RLC) protocol specification (3GPP TS 25.322 V5.1.0 Release 5); Jun. 2002; pp. 1-77; XP-002262982.

* cited by examiner

*Primary Examiner*—Andrew C. Lee
(74) *Attorney, Agent, or Firm*—Birch, Stewart, Kolasch & Birch, LLP

(57) ABSTRACT

A method for handling timers in a wireless communication system includes starting a Timer_Poll_Periodic timer for a Radio Link Control Acknowledged Mode (RLC AM) entity, performing a reset procedure for the RLC AM entity, and restarting the Timer_Poll_Periodic timerin response to the Timer_Poll_Periodic timer expiring prior to completion of the reset procedure. The claimed invention also specifies appropriate handling of eight other timers after an RLC reset or re-establishment in order to prevent the RLC AM entity from experiencing deadlock or reduction in quality of service.

3 Claims, 28 Drawing Sheets

METHOD FOR HANDLING TIMERS AFTER AN RLC RESET OR RE-ESTABLISHMENT IN A WIRELESS COMMUNICATIONS SYSTEM

BACKGROUND OF INVENTION

1. Field of the Invention

The present invention relates to a method for handling timers in a wireless communication system, and more specifically, to a method for handling timers after an RLC reset or re-establishment in a wireless communications system.

2. Description of the Prior Art

Technological advances have moved hand in hand with more demanding consumer expectations. Devices that but ten years ago were considered cutting edge are today obsolete. These consumer demands in the marketplace spur companies towards innovation. The technological advances that result only serve to further raise consumer expectations. Presently, portable wireless devices, such as cellular telephones, personal digital assistants (PDAs), notebook computers, etc., are a high-growth market. However, the communications protocols used by these wireless devices are quite old. Consumers are demanding faster wireless access with greater throughput and flexibility. This has placed pressure upon industry to develop increasingly sophisticated communications standards. The 3rd Generation Partnership Project (3GPP) is an example of such a new communications protocol.

Please refer to FIG. 1. FIG. 1 is a simplified block diagram of the prior art communications model. In a typical wireless environment, a first station 10 is in wireless communications with one or more second stations 20. The first station 10 is comprised of upper layers 12, a radio link control (RLC) entity 14, and lower layers 16 which are below the RLC 14. In the following disclosure, all of the RLC entities are assumed to be RLC acknowledged mode (RLC AM) entities. The upper layers 12 can deliver messages to the RLC 14 through service data units (SDUs) 13. The SDUs 13 may be of any size, and hold data that the upper layers 12 wish delivered to the second station 20. The RLC 14 composes the SDUs 13 into one or more protocol data units (PDUs) 15. Each PDU 15 of the RLC 14 is of a fixed size, and is delivered to the lower layers 16. The lower layers 16 include the physical layer, which is in charge of transmitting data to the second station 20.

The second station 20 shown has exactly the same basic structure as the first station 10. The second station 20 also includes upper layers 22, an RLC 24, and lower layers 26. Just as with the first station 10, the second station 20 uses the upper layers 22 to transmit SDUs 23 to the RLC 24, and uses the RLC 24 to transmit PDUs 25 to the lower layers 26. The data transmitted by the first station 10 is received by lower layers 26 of the second station 20 and reconstructed into one or more PDUs 25, which are passed up to the RLC 24. The RLC 24 receives the PDUs 25 and from them assembles one or more SDUs 23, which are then passed up to the upper layers 22. The upper layers 22, in turn, convert the SDUs 23 back into messages, which should be identical to the original messages that were generated by the first station 10. In communication systems, the terms SDU and PDU have broad meanings. For purposes of the following disclosure, the term "SDU" is used to indicate SDUs passed from the upper layers to the RLC, and the term "PDU" should be understood as PDUs passed from the RLC to lower layers.

In addition, for simplicity the following disclosure will be written from, the perspective of the first station 10, unless otherwise noted.

Please refer to FIGS. 2A and 2B. FIGS. 2A and 2B are message sequence charts illustrating a reset procedure for peer RLC AM entities according to the prior art. In all the message sequence charts used in the following disclosure, the progression of time is shown from top to bottom. In FIG. 2A, the first station 10 is shown initiating the reset procedure by sending a RESET PDU to the second station 20. From the perspective of the first station 10, the reset procedure begins with transmission of the RESET PDU, and is not finished until a RESET ACK PDU is received from the second station 20. From the perspective of the second station 20, the reset procedure begins upon reception of the RESET PDU, and ends after transmission of the RESET ACK PDU to the first station 10. In FIG. 2B, the opposite scenario is shown. That is, the second station 20 initiates the reset procedure by sending a RESET PDU to the first station 10, and the first station 10 acknowledges this RESET PDU by sending a RESET ACK PDU to the second station 20. Therefore, either one of the peer RLC entities 14 and 24 contained in the first and second stations 10 and 20 can initiate a reset procedure.

Resetting and re-establishing stopping the RLC 14 is defined by the $3^{rd}$ Generation Partnership Project (3GPP) specification 3GPP TS 25.322 V3.11.0 "RLC Protocol Specification", which is included herein by reference. According to the current RLC reset procedure for acknowledged mode, all timers except for a Timer_RST timer are stopped for each peer RLC AM entity upon completion of the reset procedure for that entity. Therefore, Timer_Poll, Timer_Poll_Prohibit, Timer_EPC, Timer_Discard, Timer_Poll_Periodic, Timer_Status_Prohibit, Timer_Status_Periodic, and Timer_MRW are all stopped during a reset procedure. For an example, please refer back to FIG. 2A. All of the timers except for the Timer_RST timer would be stopped by the RLC entity 24 of the second station 20 after the RESET ACK PDU is sent to the first station 10. In addition, all of the timers would be stopped by the RLC entity 14 of the first station 10 after the RESET ACK PDU is received from the second station 20.

During an RLC re-establishment function for acknowledged mode and unacknowledged mode, upper layers may request re-establishment of an RLC entity.

However, the 3GPP TS 25.322 V3.11.0 specification does not specify how each of the previously mentioned timers should be handled during re-establishment. Due to this lack of guidelines, potential problems could develop due to the improper use of the timers.

Please refer to FIG. 3. FIG. 3 is a phase diagram illustrating a transmission window of an RLC AM entity according to the prior art. During normal operation, the RLC AM entity 14 (transmitter) transmits acknowledged mode data (AMD) PDUs to the RLC AM entity 24 (receiver), and each PDU is marked with a sequence number (SN). The SNs have a fixed bit length of n bits. In the preferred embodiment, the bit length n is 12. Hence, the SNs have a range of values from zero to 4095 ($2^{12}-1$). The phase diagram for SNs can thus be represented by a circle. For the following example, point 30 is the sequentially lowest transmitter PDU SN value waiting for acknowledgment from the receiver in the form of a STATUS PDU, which contains information on which PDUs have been acknowledged. In other words, point 30 marks the beginning of the transmitting window. In this example, assume a window size=X. Point 32 marks the highest PDU SN value of an AMD PDU that has been sent so far. Therefore, in order to prevent the transmitting window from filling up, the difference of PDU SN values at point 32 and point 30 has to be less than X. Otherwise, the transmitting window fills up, and deadlock occurs. Deadlock can occur if AMD PDUs sent from the transmitter to the receiver are not properly acknowledged by the receiver. This would cause point 30 to remain stationary, and the difference between point 32 and point 30 would eventually equal the maximum window size of X.

Please refer to FIG. 4. FIG. 4 is a message sequence chart illustrating problems occurring with the Timer_Poll_Periodic timer during the prior art reset and re-establishment procedures. The Timer_Poll_Periodic timer is used by the RLC AM entity 14 to poll its peer RLC AM entity 24 to send a STATUS PDU. When the Timer_Poll_Periodic timer of the RLC AM entity 14 expires, a poll request is send to the RLC AM entity 24 asking for a STATUS PDU to be sent back to the RLC AM entity 14.

First of all, the Timer_Poll_Periodic timer is started for the RLC AM entity 14 of the first station 10 when the RLC AM entity 14 is created. Next, upon reception of a RESET PDU or a RESET ACK PDU, the RLC AM entity 14 is reset, which causes the Timer_Poll_Periodic timer to be stopped. Unfortunately, the Timer_Poll_Periodic timer is never restarted after the reset procedure. Therefore, the Timer_Poll_Periodic timer does not ever get started again, and cannot trigger a poll to the peer RLC AM entity 24 upon expiration of the timer. This means that AMD PDUs with lower SN values indicated by point 30 in FIG. 3 will never be acknowledged. Since point 30 never moves, eventually the difference between point 32 and point 30 will equal the transmission window size of X. Thus, because the timer remains stopped, deadlock occurs, and the RLC AM entity 14 cannot transmit additional PDUs to the peer RLC AM entity 24.

Please refer to FIG. 5. FIG. 5 is a message sequence chart illustrating problems occurring with the Timer_Status_Periodic timer during the prior art reset and re-establishment procedures. The following illustrates the case where the RLC AM entity 14 is configured to use the Timer_Poll_Periodic timer, and the RLC AM entity 24 is configured to use the Timer_Status_Periodic timer. The Timer_Status_Periodic timer is used by the RLC AM entity 24 to send STATUS PDUs to its peer RLC AM entity 14. When the Timer_Status_Periodic timer of the RLC AM entity 24 expires, a STATUS PDU is generated and sent to the RLC AM entity 14. This STATUS PDU informs the RLC AM entity 14 which AMD PDUs have been acknowledged.

First of all, the Timer_Status_Periodic timer is started for the RLC AM entity 24 of the second station 20 when the RLC AM entity 24 is created. Also, the status function "Detection of missing PDU(s)" may be configured for the RLC AM entity 24. If this function is configured, it is triggered only when missing PDU(s) are detected. Next, upon reception of a RESET PDU or a RESET ACK PDU, the RLC AM entity 24 is reset, which causes the Timer_Status_Periodic timer to be stopped. Unfortunately, the Timer_Status_Periodic timer is never restarted after the reset procedure. Therefore, the Timer_Status_Periodic timer does not ever get started again, and cannot trigger a poll to the peer RLC AM entity 14 upon expiration of the timer. This means that AMD PDUs with lower SN values indicated by point 30 in FIG. 3 will never be acknowledged. Since point 30 never moves, eventually the difference between point 32 and point 30 will equal the transmission window size of X. Thus, because the timer remains stopped, deadlock occurs, and the RLC AM entity 24 cannot transmit additional PDUs to the peer RLC AM entity 14.

In summary, even though the RLC AM entity 14 was configured to use the Timer_Poll_Periodic timer and the RLC AM entity 24 was configured to use the Timer_Status_Periodic timer, both of these timers are stopped during a reset procedure. Furthermore, neither of these timers are ever restarted, not even during re-establishment. Thus, deadlock occurs due to the way these two timers are handled.

Please refer to FIG. 6. FIG. 6 is a message sequence chart illustrating problems occurring with the Timer_Discard timer during the prior art reset and re-establishment procedures. The Timer_Discard timer is used by the peer RLC entities 14 and 24 (although only RLC AM entity 14 will be used as an example) to determine when SDUs 13 received from upper layers should be discarded. For each SDU 13 the RLC AM entity 14 receives from upper layers, a corresponding Timer_Discard timer is started for that SDU. When the Timer_Discard timer of the RLC AM entity 14 expires, the corresponding SDU 13 is discarded if the SDU 13 still remains in the RLC AM entity 14.

First of all, the Timer_Discard timer is started for each SDU 13 when the RLC AM entity 14 receives the SDUs 13 from upper layers. Next, upon reception of a RESET PDU or a RESET ACK PDU, the RLC AM entity 14 is reset, which causes the Timer_Discard timer for each SDU 13 to be stopped. Unfortunately, none of the Timer_Discard timers for the corresponding SDUs 13 are ever restarted after the reset procedure. Therefore, the Timer_Discard timers do not ever get started again, and the corresponding SDUs 13 are never appropriately dealt with. Since these SDUs 13 being held in the RLC AM entity 14 cannot be discarded, the RLC AM entity 14 is not able to properly account for these SDUs 13, and quality of service (QoS) cannot be maintained.

Therefore, since the current 3GPP specification does not specify how each of the previously mentioned timers should be handled during re-establishment, deadlock can occur and quality of service may be reduced substantially.

SUMMARY OF INVENTION

It is therefore a primary objective of the claimed invention to provide a method for handling timers after an RLC reset or re-establishment in a wireless communications system in order to solve the above-mentioned problems.

According to the claimed invention, a method for handling timers in a wireless communication system includes starting a Timer_Poll_Periodic timer for a Radio Link Control Acknowledged Mode (RLC AM) entity, performing a reset procedure for the RLC AM entity, and restarting the Timer_Poll_Periodic timerin response to the Timer_Poll_Periodic timer expiring prior to completion of the reset procedure. The claimed invention also specifies appropriate handling of eight other timers after an RLC reset or re-establishment.

It is an advantage of the claimed invention that appropriately handling each timer after an RLC reset or re-establishment can prevent the RLC AM entity from experiencing deadlock or reduction in quality of service.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
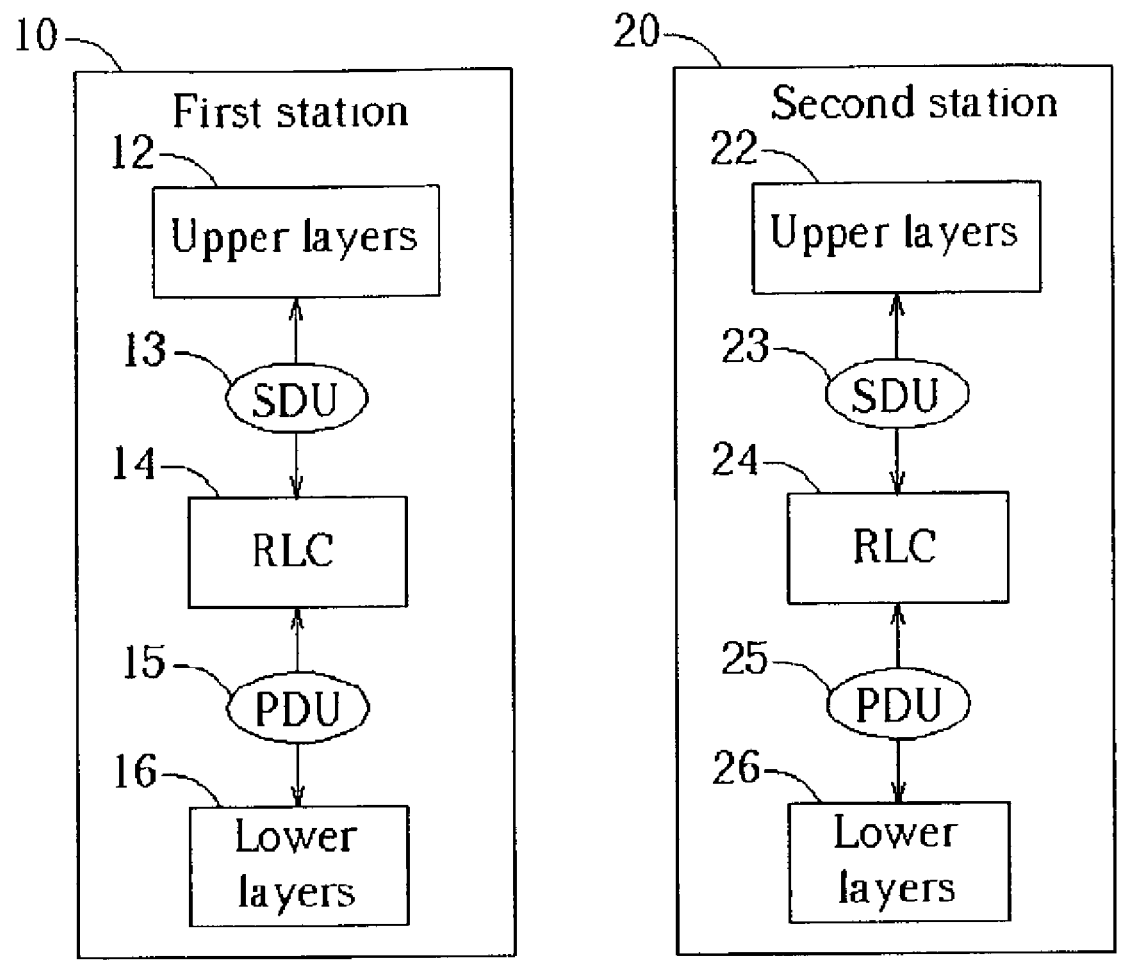
FIG. 1 is a simplified block diagram of the prior art communications model.
Figure 2A:
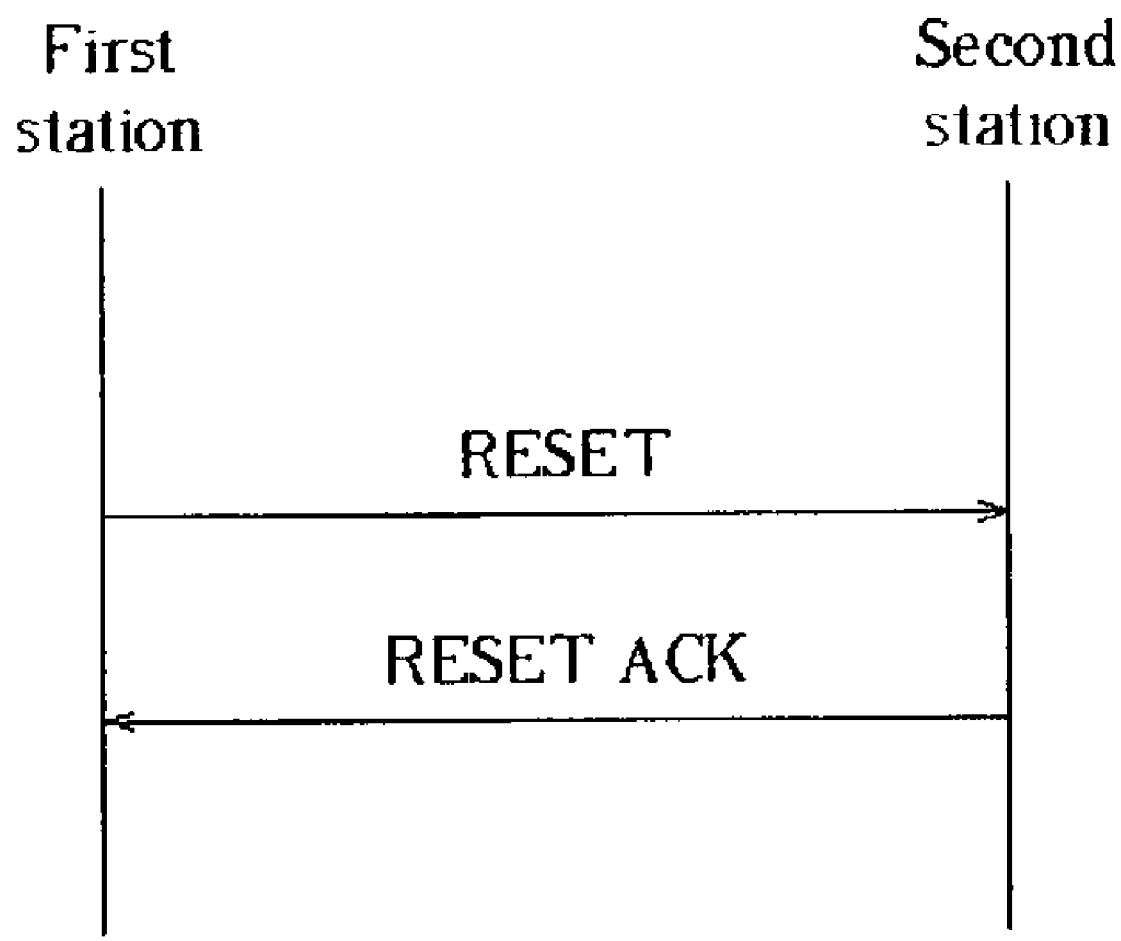
FIGS. 2A and 2B are message sequence charts illustrating a reset procedure for peer RLC AM entities according to the prior art.
Figure 2B:
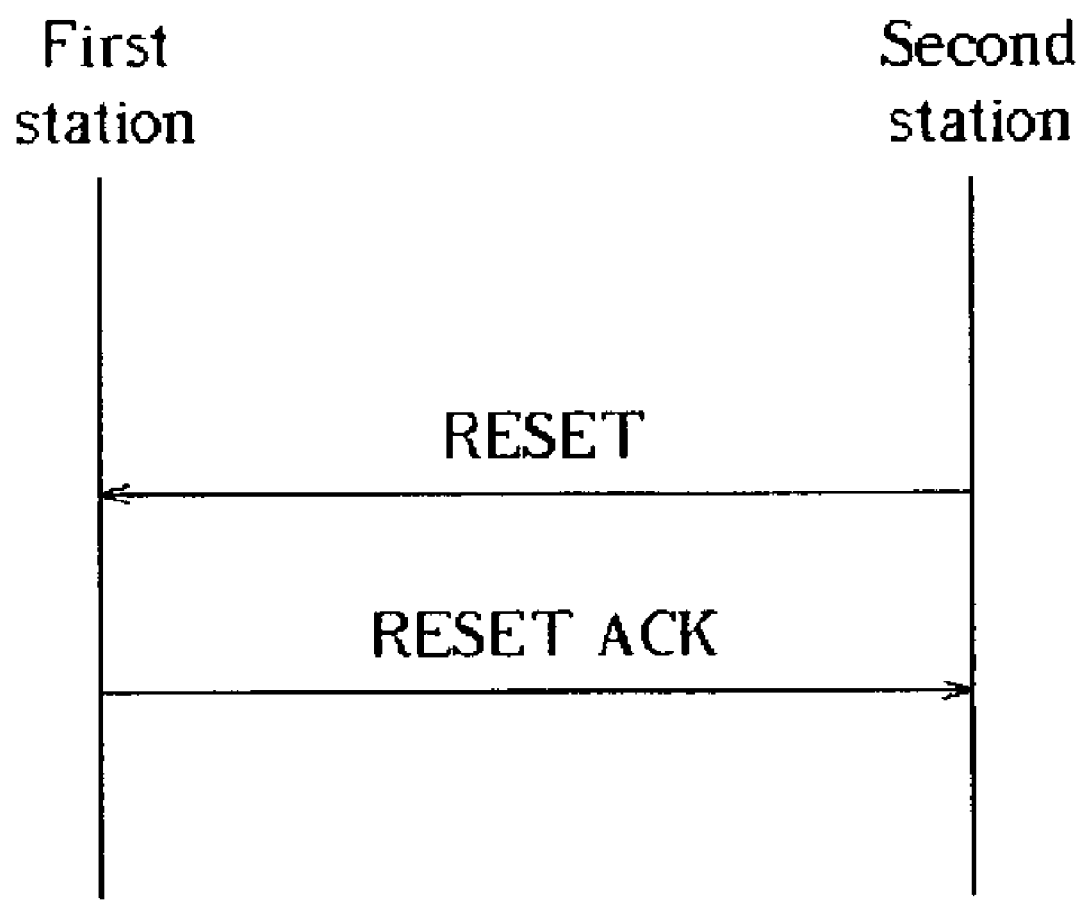
Figure 3:
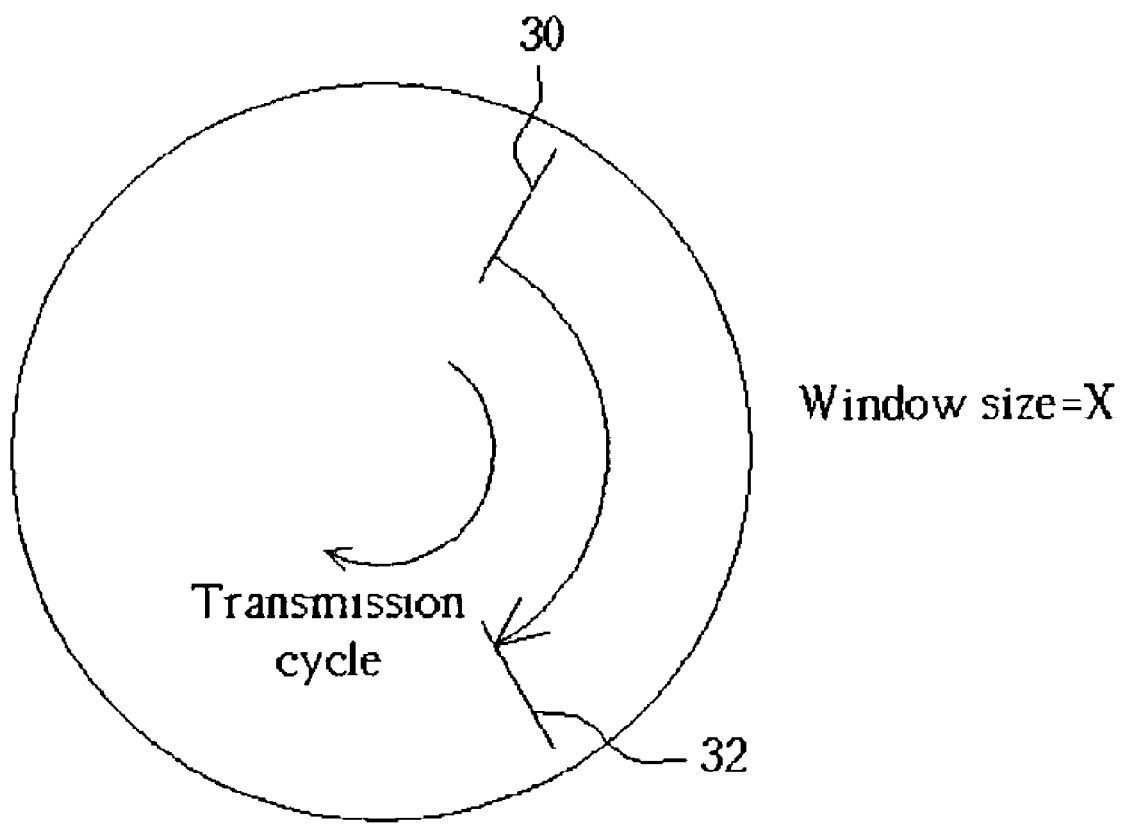
FIG. 3 is a phase diagram illustrating a transmission window of an RLC AM entity according to the prior art.
Figure 4:
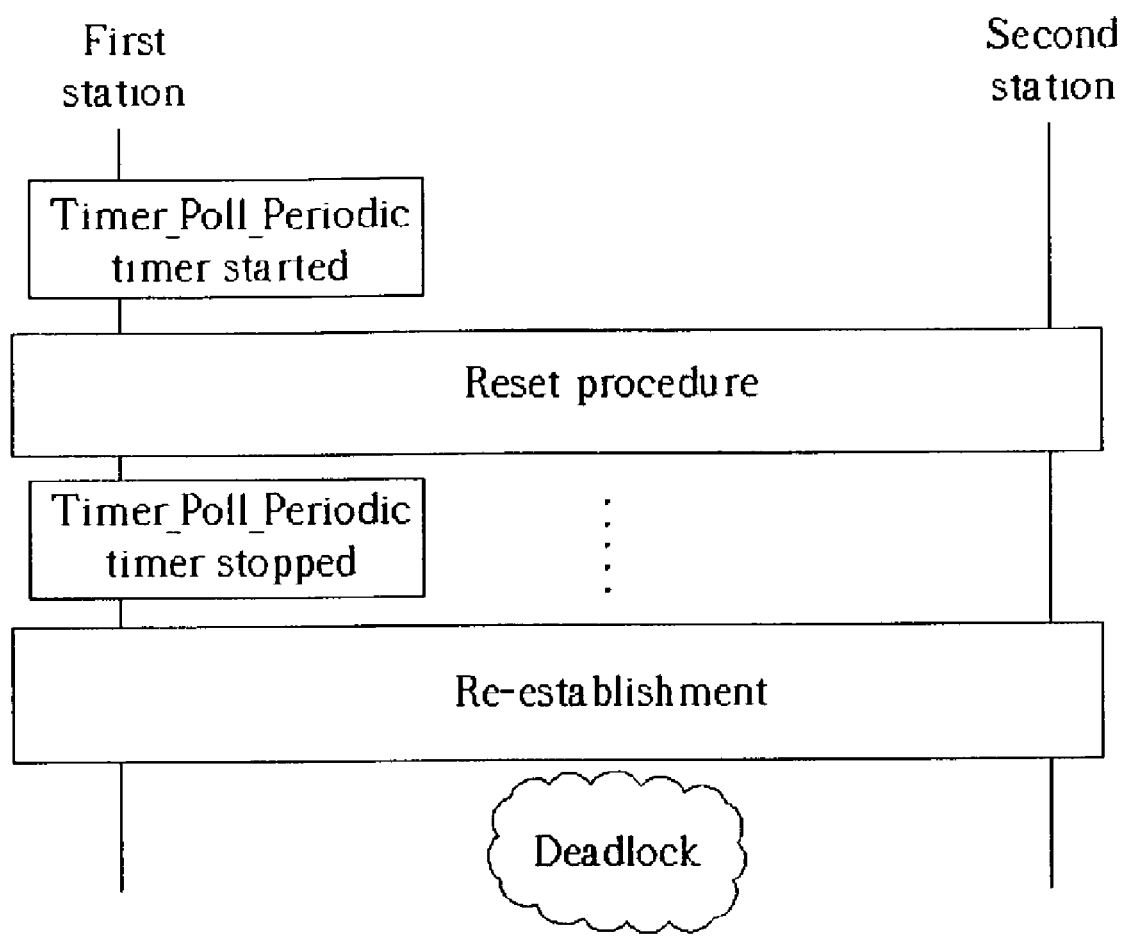
FIG. 4 is a message sequence chart illustrating problems occurring with the Timer_Poll_Periodic timer during the prior art reset and re-establishment procedures.
Figure 5:
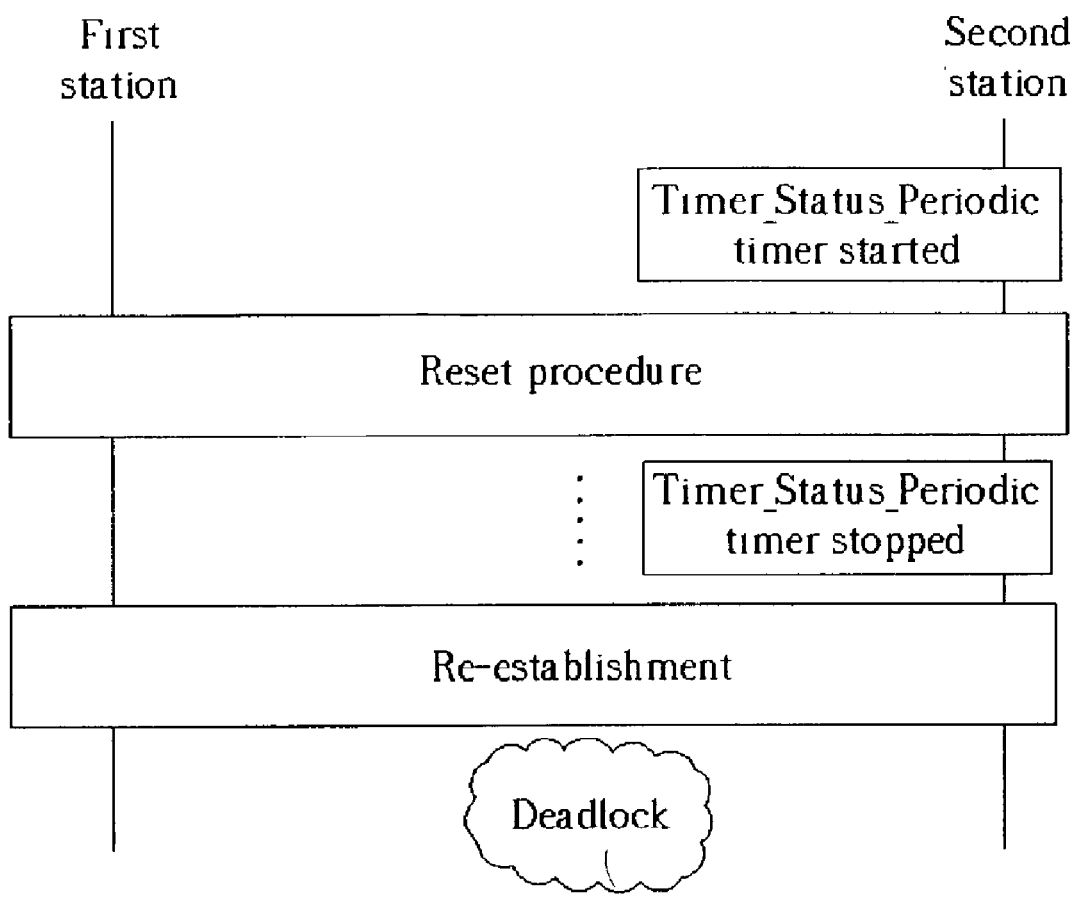
FIG. 5 is a message sequence chart illustrating problems occurring with the Timer_Status_Periodic timer during the prior art reset and re-establishment procedures.
Figure 6:
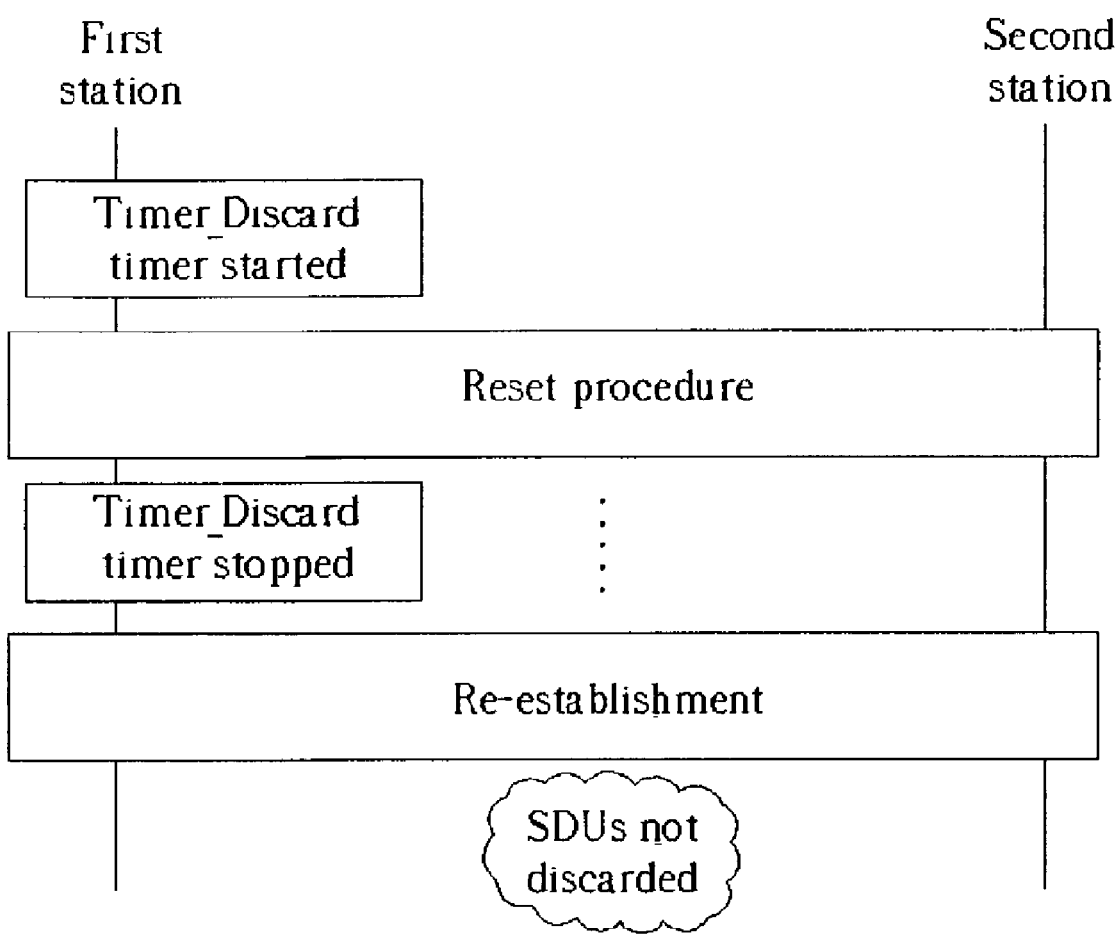
FIG. 6 is a message sequence chart illustrating problems occurring with the Timer_Discard timer during the prior art reset and re-establishment procedures.
Figure 7A:
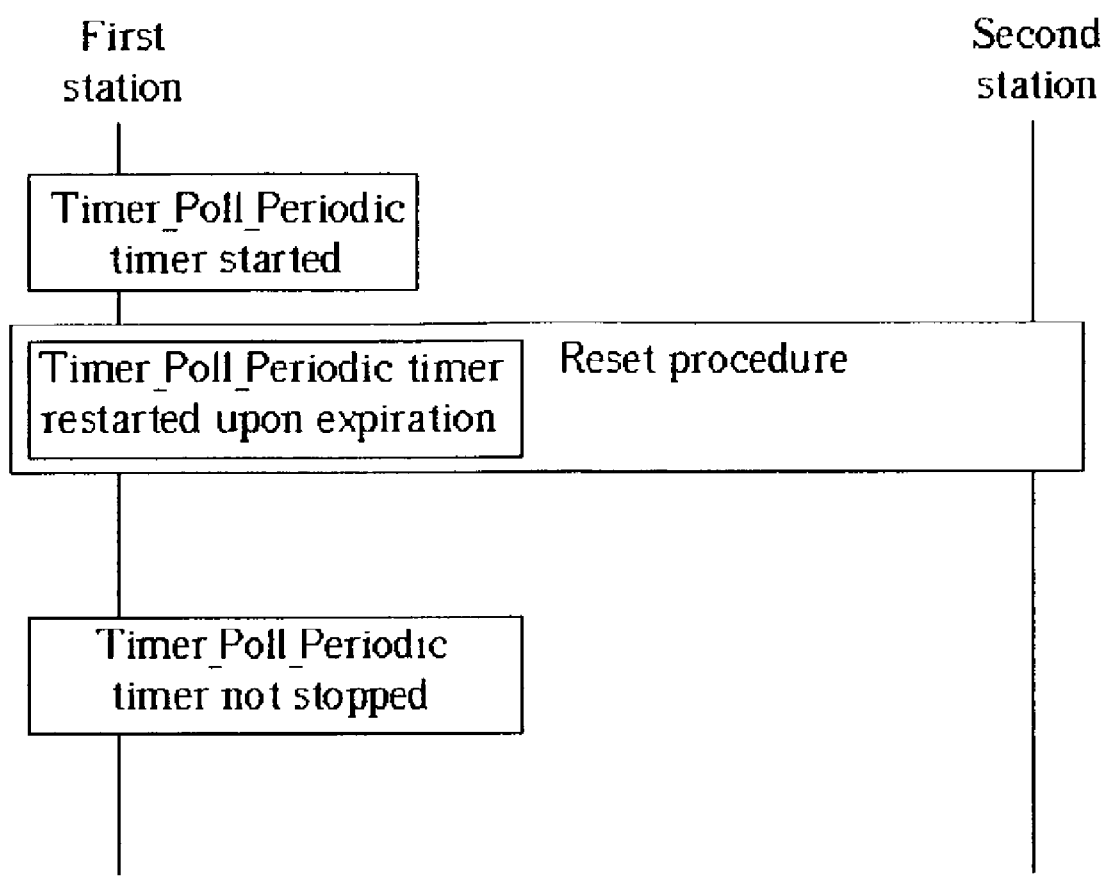
FIGS. 7A and 7B are message sequence charts illustrating handling of the Timer_Poll_Periodic timer during a reset procedure according to the present invention.
Figure 7B:
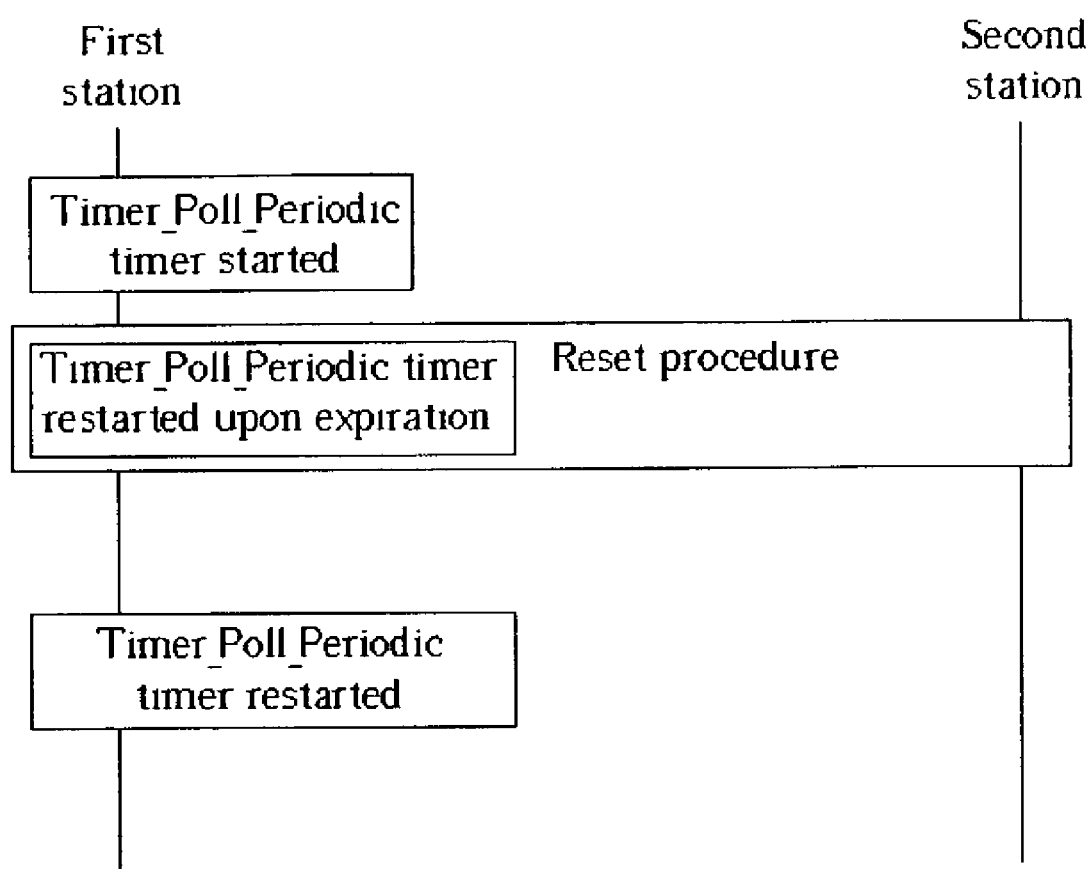

Please refer to FIGS. 7A and 7B. FIGS. 7A and 7B are message sequence charts illustrating handling of the Timer_Poll_Periodic timer during a reset procedure according to the present invention. For convenience, FIGS. 7A and 7B and all message sequence charts will be illustrated from the perspective of the first station 10 initiating a reset procedure. However, the present invention will be fully explained from the perspective of both the first station 10 and the second station 20.

First of all, the Timer_Poll_Periodic timer is started for the RLC AM entity 14 of the first station 10 when the RLC AM entity 14 is created. Next, the RLC AM entity 14 begins a reset procedure by sending a RESET PDU to the RLC AM entity 24 of the second station 20. When the RLC AM entity 14 has already transmitted a RESET PDU to the RLC AM entity 24 and has not yet received acknowledgement in the form of a RESET ACK PDU, if the Timer_Poll_Periodic timer expires, the present method invention includes restarting the Timer_Poll_Periodic timer. The reset procedure is then concluded when the RLC AM entity 14 receives a RESET ACK PDU. Upon reception of this RESET ACK PDU, the present invention method includes not stopping the Timer_Poll_Periodic timer. Alternately, as shown in FIG. 7B, the present invention method includes restarting the Timer_Poll_Periodic timer instead of simply not stopping it. On the other hand, suppose the RLC AM entity 24 of the second station 20 is also running a Timer_Poll_Periodic timer. When the RLC AM entity 24 receives RESET PDU to begin the reset procedure, the present invention method includes not stopping the Timer_Poll_Periodic timer or restarting the Timer_Poll_Periodic timer.

Thus, for a reset procedure, the handling of the Timer_Poll_Periodic timer can be summarized as follows: when a RESET PDU has already been transmitted and not yet been acknowledged by a RESET ACK PDU, if the Timer_Poll_Periodic timer expires, the Timer_Poll_Periodic timer is restarted; and upon reception of a RESET PDU or RESET ACK PDU, the Timer_Poll_Periodic timer is not stopped or is restarted. By not stopping or restarting the Timer_Poll_Periodic timer, the RLC AM entity 14 will continue to be able to poll its peer RLC AM entity 24, and will prevent deadlock from occurring.

Figure 8A:
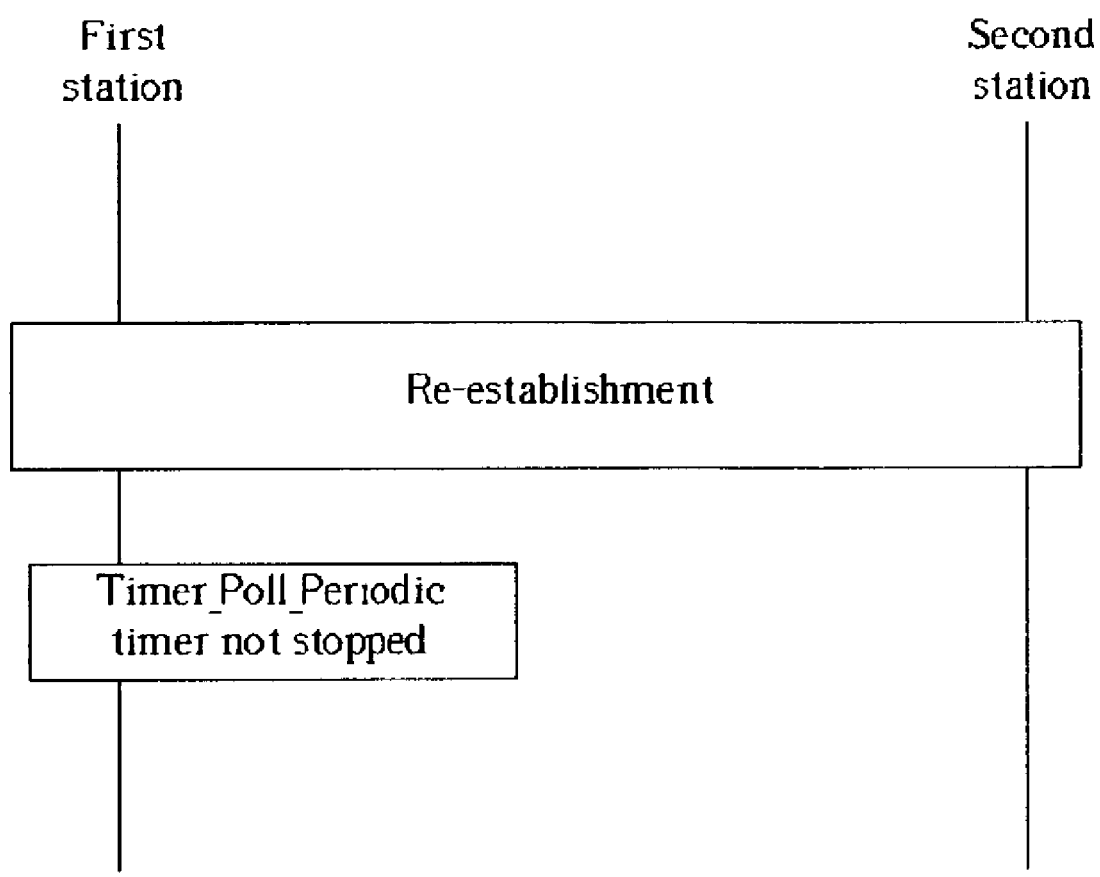
FIGS. 8A and 8B are message sequence charts illustrating handling of the Timer_Poll_Periodic timer during a re-establishment function according to the present invention.
Figure 8B:
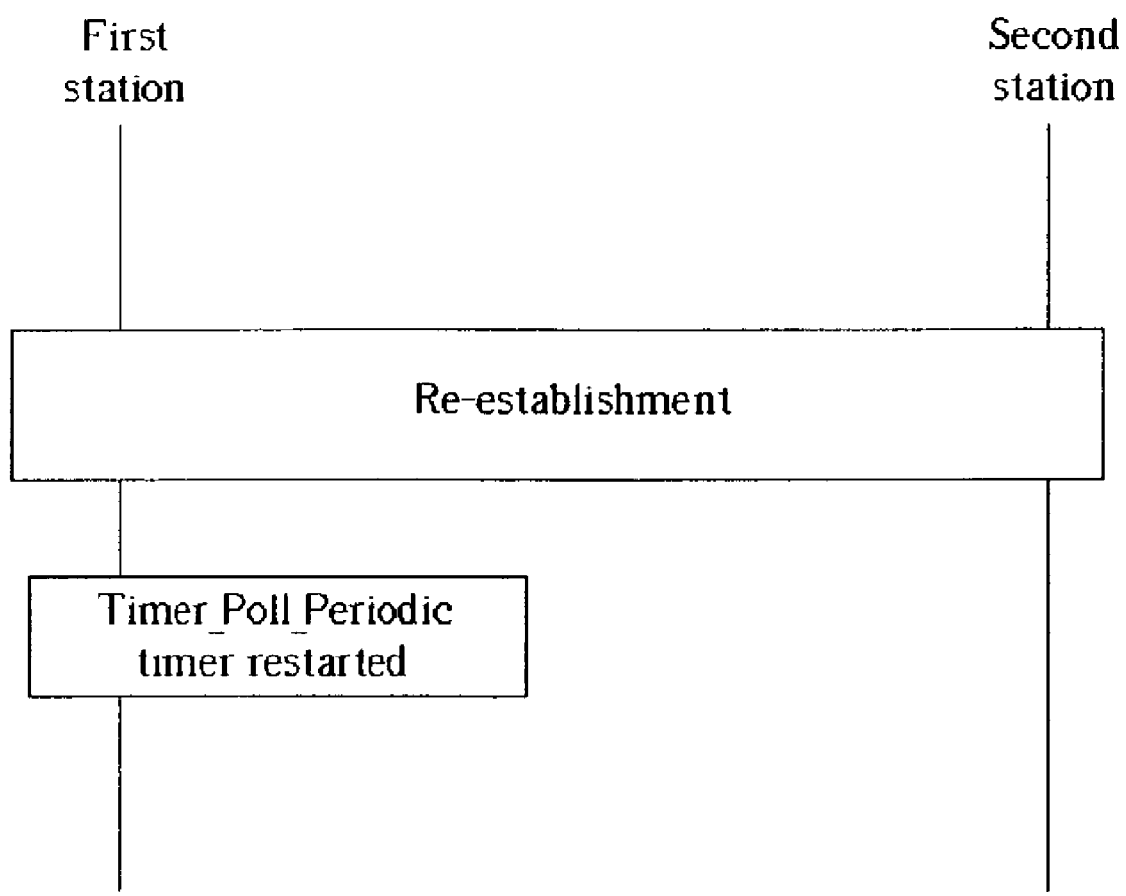

Please refer to FIGS. 8A and 8B. FIGS. 8A and 8B are message sequence charts illustrating handling of the Timer_Poll_Periodic timer during a re-establishment function according to the present invention. After the RLC AM entity 14 is re-established by upper layers, the present invention method includes not stopping the Timer_Poll_Periodic timer. Alternately, as shown in FIG. 8B, the present invention method includes restarting the Timer_Poll_Periodic timer.

Thus, for a re-establishment function, the handling of the Timer_Poll_Periodic timer can be summarized as follows: after re-establishment, the Timer_Poll_Periodic timer is not stopped or is restarted. By not stopping or restarting the Timer_Poll_Periodic timer, the RLC AM entity 14 will continue to be able to poll its RLC AM entity 24 now that the RLC AM entity 14 has been re-established, and will prevent deadlock from occurring.

Figure 9A:
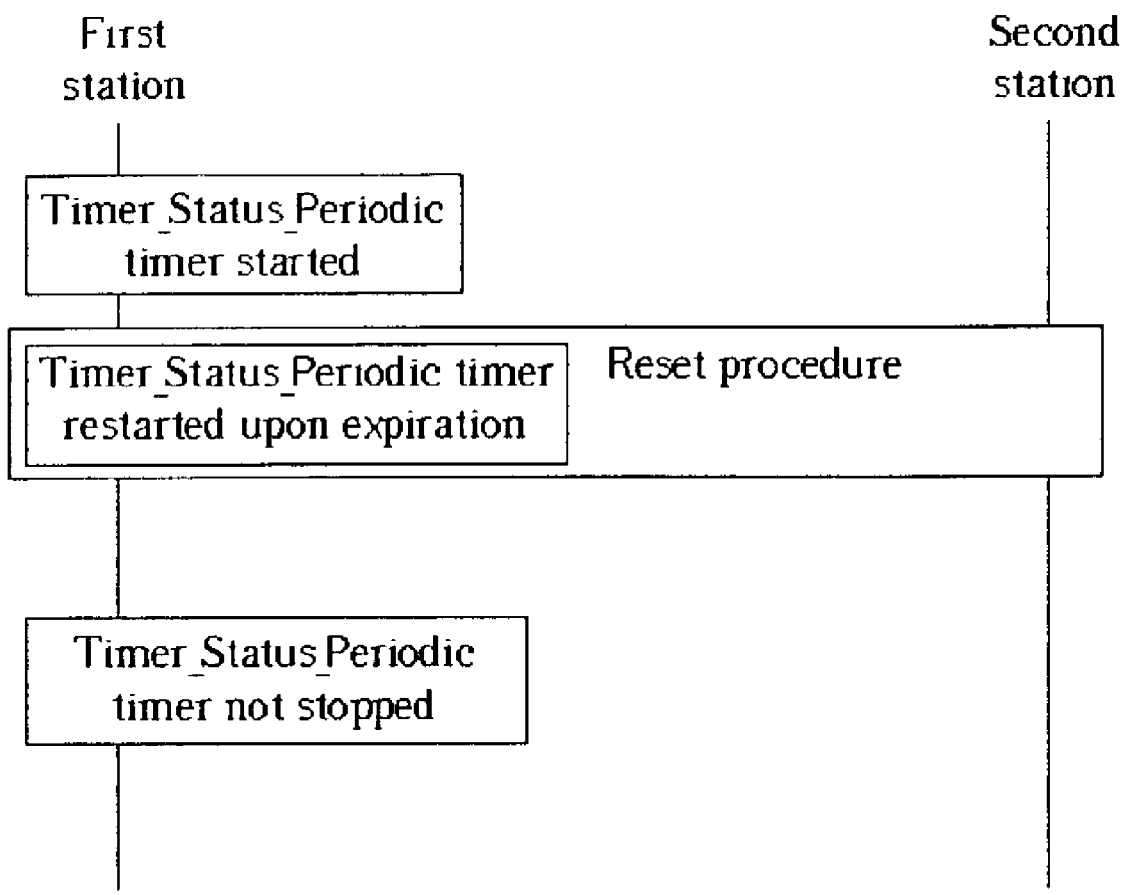
FIGS. 9A and 9B are message sequence charts illustrating handling of the Timer_Status_Periodic timer during a reset procedure according to the present invention.
Figure 9B:
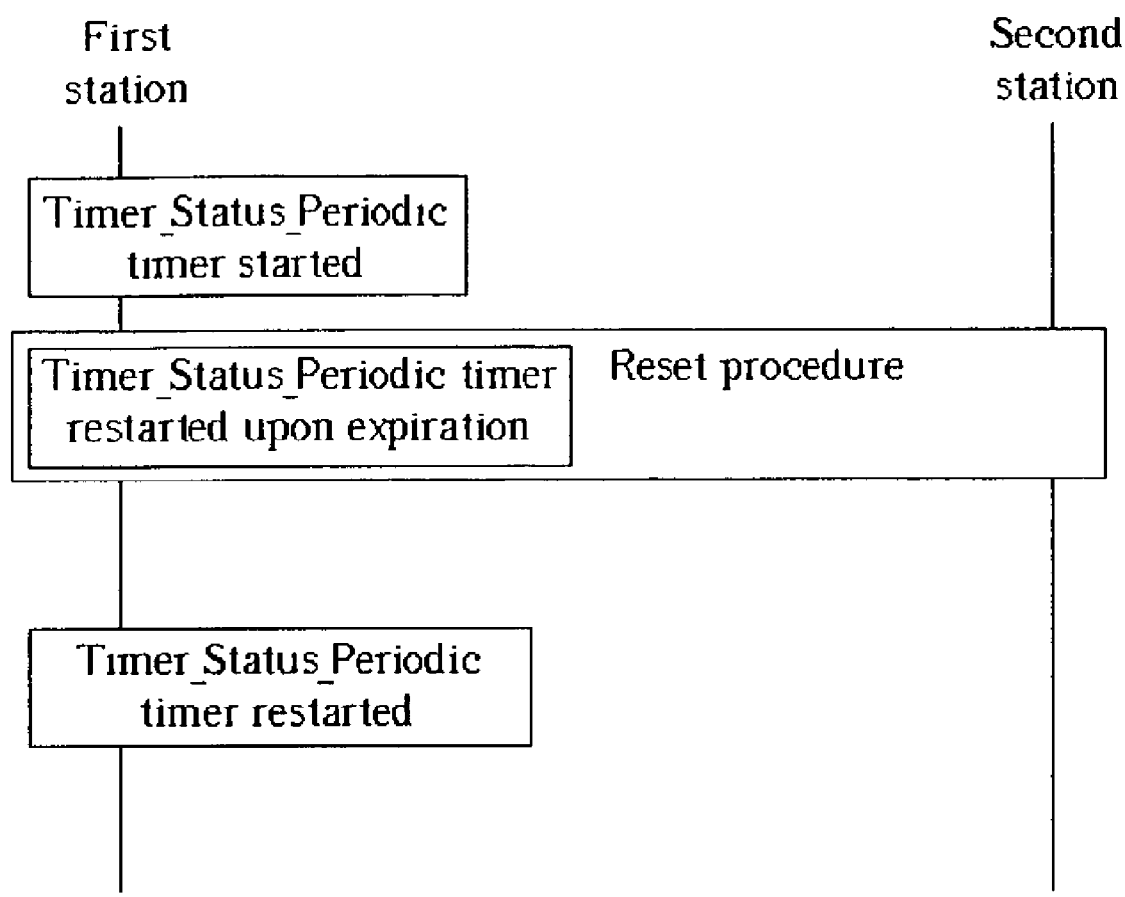

Please refer to FIGS. 9A and 9B. FIGS. 9A and 9B are message sequence charts illustrating handling of the Timer_Status_Periodic timer during a reset procedure according to the present invention. First of all, the Timer_Status_Periodic timer is started for the RLC AM entity 14 of the first station 10 when the RLC AM entity 14 is created. Next, the RLC AM entity 14 begins a reset procedure by sending a RESET PDU to the RLC AM entity 24 of the second station 20. When the RLC AM entity 14 has already transmitted a RESET PDU to the RLC AM entity 24 and has not yet received acknowledgement in the form of a RESET ACK PDU, if the Timer_Status_Periodic timer expires, the present method invention includes restarting the Timer_Status_Periodic timer. The reset procedure is then concluded when the RLC AM entity 14 receives a RESET ACK PDU. Upon reception of this RESET ACK PDU, the present invention method includes not stopping the Timer_Status_Periodic timer. Alternately, as shown in FIG. 9B, the present invention method includes restarting the Timer_Status_Periodic timer instead of simply not stopping it. On the other hand, suppose the RLC AM entity 24 of the second station 20 is also running a Timer_Status_Periodic timer. When the RLC AM entity 24 receives the RESET PDU to begin the reset procedure, the present invention method includes not stopping the Timer_Status_Periodic timer or restarting the Timer_Status_Periodic timer.

Thus, for a reset procedure, the handling of the Timer_Status_Periodic timer can be summarized as follows: when a RESET PDU has already been transmitted and not yet been acknowledged by a RESET ACK PDU, if the Timer_Status_Periodic timer expires, the Timer_Status_Periodic timer is restarted; and upon reception of a RESET PDU or RESET ACK PDU, the Timer_Status_Periodic timer is not stopped or is restarted. By not stopping or restarting the Timer_Status_Periodic timer, the RLC AM entity 14 will continue to be able to periodically send STATUS PDUs to its peer RLC AM entity 24, and will prevent deadlock from occurring.

Figure 10A:
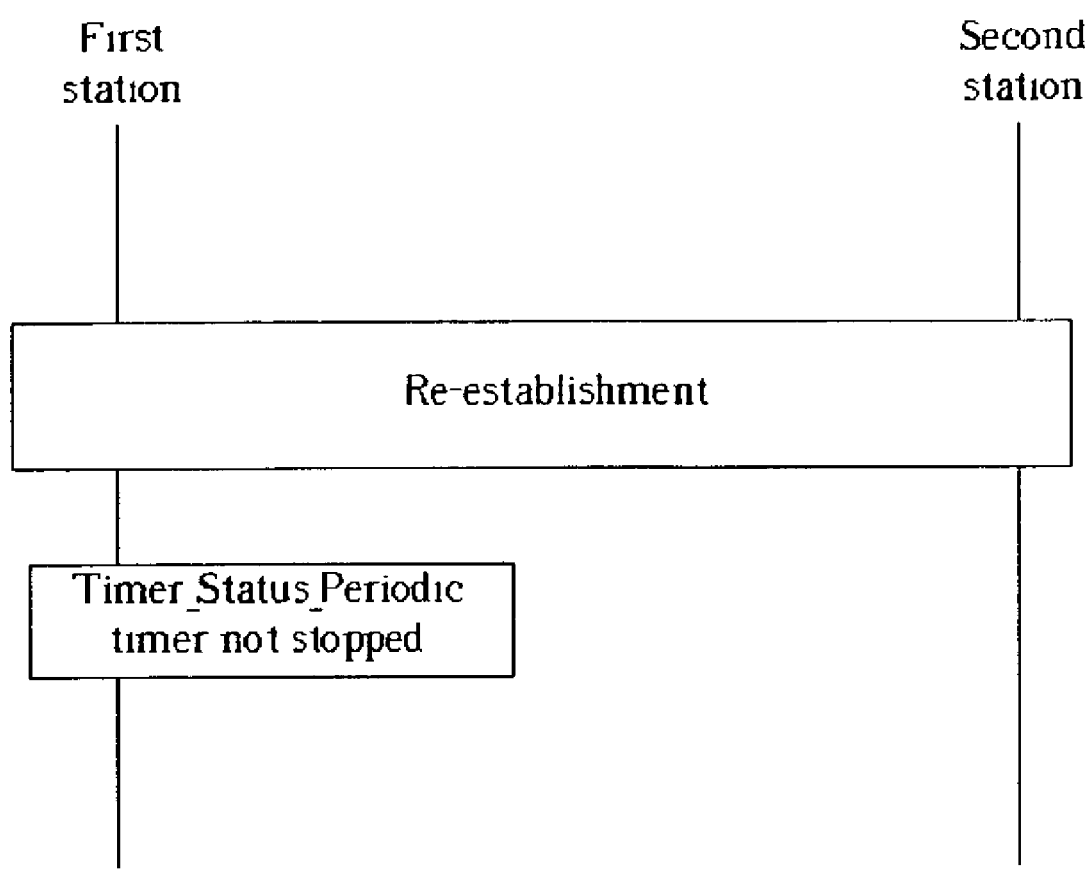
FIGS. 10A and 10B are message sequence charts illustrating handling of the Timer_Status_Periodic timer during a re-establishment function according to the present invention.
Figure 10B:
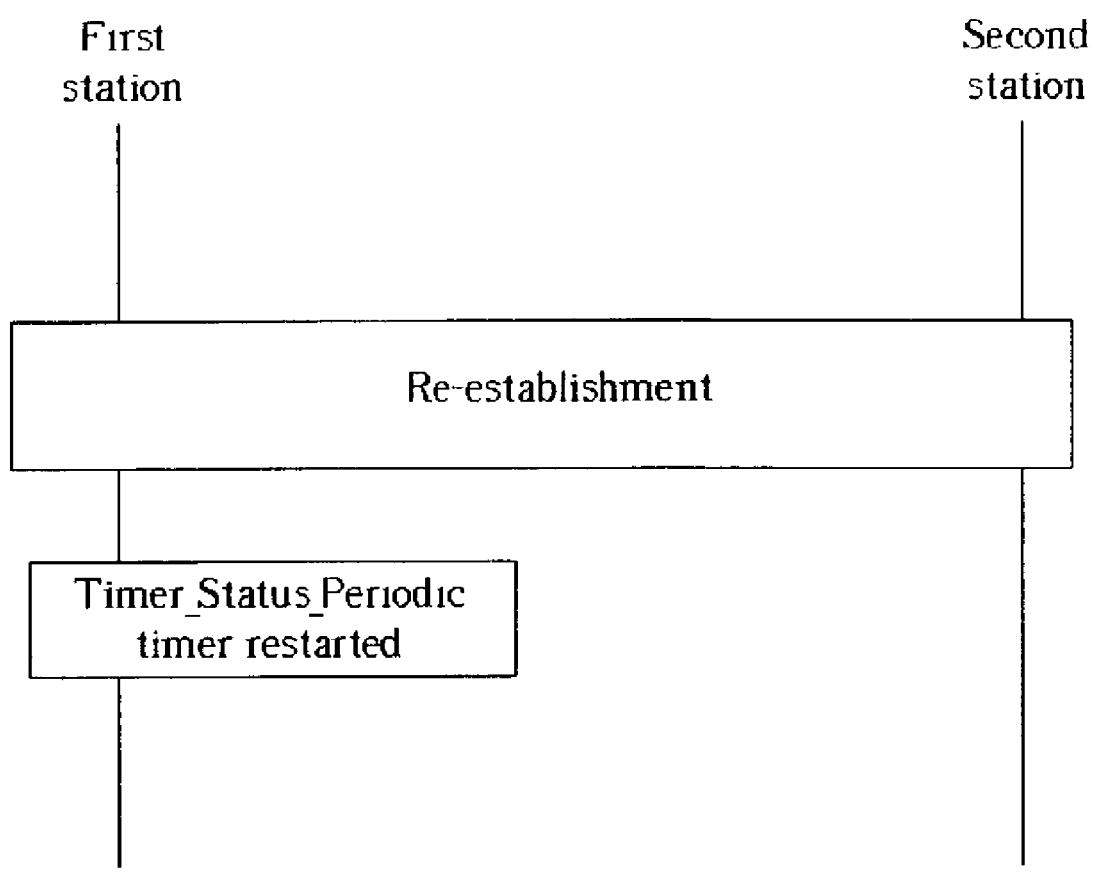

Please refer to FIGS. 10A and 10B. FIGS. 10A and 10B are message sequence charts illustrating handling of the Timer_Status_Periodic timer during a re-establishment function according to the present invention. After the RLC AM entity 14 is re-established by upper layers, the present invention method includes not stopping the Timer_Status_Periodic timer. Alternately, as shown in FIG. 10B, the present invention method includes restarting the Timer_Status_Periodic timer.

Thus, for a re-establishment function, the handling of the Timer_Status_Periodic timer can be summarized as follows: after re-establishment, the Timer_Status_Periodic timer is not stopped or is restarted. By not stopping or restarting the Timer_Status_Periodic timer, the RLC AM entity 14 will continue to be able to send STATUS PDUs to its peer RLC AM entity 24 now that the RLC AM entity 14 has been re-established, and will prevent deadlock from occurring.

Figure 11A:
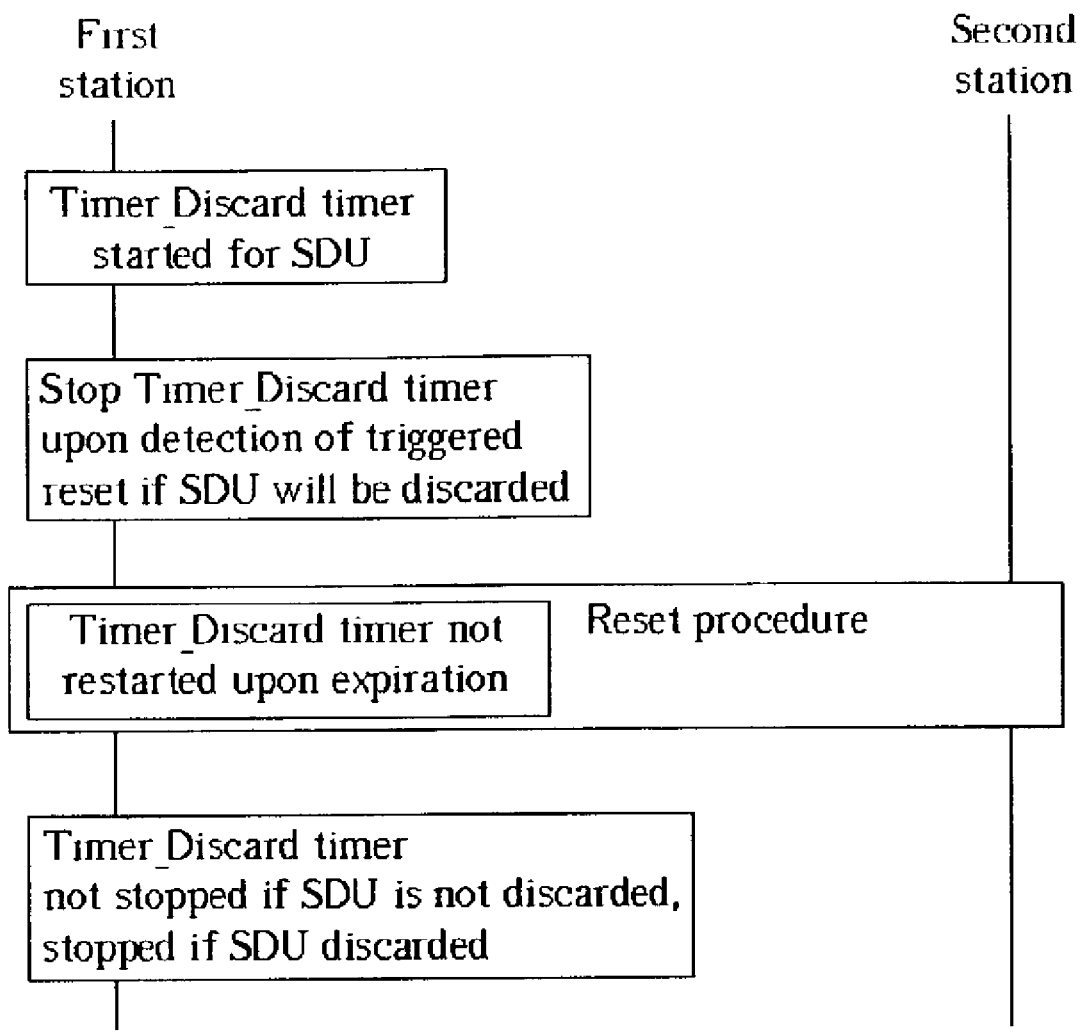
FIGS. 11A and 11B are message sequence charts illustrating handling of the Timer_Discard timer during a reset procedure according to the present invention.
Figure 11B:
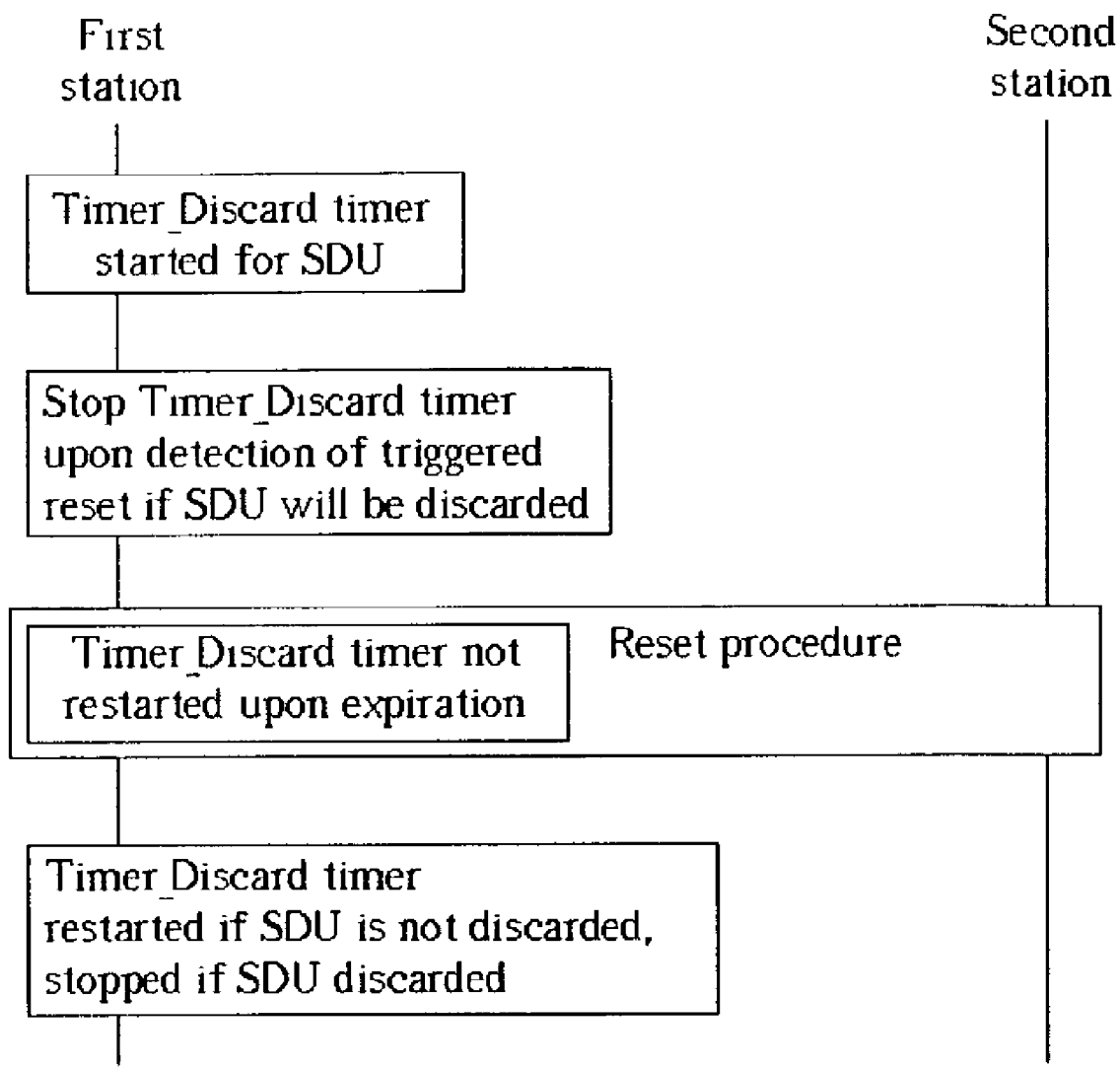

Please refer to FIGS. 11A and 11B. FIGS. 11A and 11B are message sequence charts illustrating handling of the Timer_Discard timer during a reset procedure according to the present invention. First of all, the Timer_Discard timer is started for each SDU 13 of the RLC AM entity 14 when the SDU 13 is received from upper layers. Next, if the RLC AM entity 14 is triggered to send a RESET PDU to the RLC AM entity 24, the present method invention includes stopping the Timer_Discard timer if the corresponding SDU 13 will be discarded. After that, the RLC AM entity 14 begins a reset procedure by sending a RESET PDU to the RLC AM entity 24 of the second station 20. When the RLC AM entity 14 has already transmitted a RESET PDU to the RLC AM entity 24 and has not yet received acknowledgement in the form of a RESET ACK PDU, if the Timer_Discard timer expires, the present method invention includes not restarting the Timer_Discard timer. The reset procedure is then concluded when the RLC AM entity 14 receives a RESET ACK PDU. Upon reception of this RESET ACK PDU, the present invention method includes not stopping the Timer_Discard timer if the corresponding SDU 13 is not discarded, or stopping the Timer_Discard timer if the corresponding SDU 13 is discarded. Alternately, as shown in FIG. 11B, the present invention method includes restarting the Timer_Discard timer if the corresponding SDU 13 is not discarded, or stopping the Timer_Discard timer if the corresponding SDU 13 is discarded. On the other hand, suppose the RLC AM entity 24 of the second station 20 is also running a Timer_Discard timer. When the RLC AM entity 24 receives the RESET PDU to begin the reset procedure, the present invention method includes not stopping or restarting the Timer_Discard timer if the corresponding SDU 23 is not discarded, or stopping the Timer_Discard timer if the corresponding SDU 23 is discarded.

Thus, for a reset procedure, the handling of the Timer_Discard timer can be summarized as follows: if the condition for triggering a reset procedure is detected, the Timer_Discard timer is stopped if the corresponding SDU will be discarded; when a RESET PDU has already been transmitted and not yet been acknowledged by a RESET ACK PDU, if the Timer_Discard timer expires, the Timer_Discard timer is not restarted; upon reception of a RESET PDU or RESET ACK PDU, the Timer_Discard timer is not stopped or is restarted if the corresponding SDU is not discarded; and upon reception of a RESET PDU or RESET ACK PDU, the Timer_Discard timer is stopped if the corresponding SDU is discarded. Please note that the Timer_Discard timer can be stopped when the condition for triggering the reset was detected, or upon reception of the RESET PDU or RESET ACK PDU if the corresponding SDU is discarded. By not stopping or restarting the Timer_Discard timer for SDUs 13 that will not be discarded, the RLC AM entity 14 will still be able to account for SDUs 13 that are not discarded, and will maintain quality of service.

Figure 12:
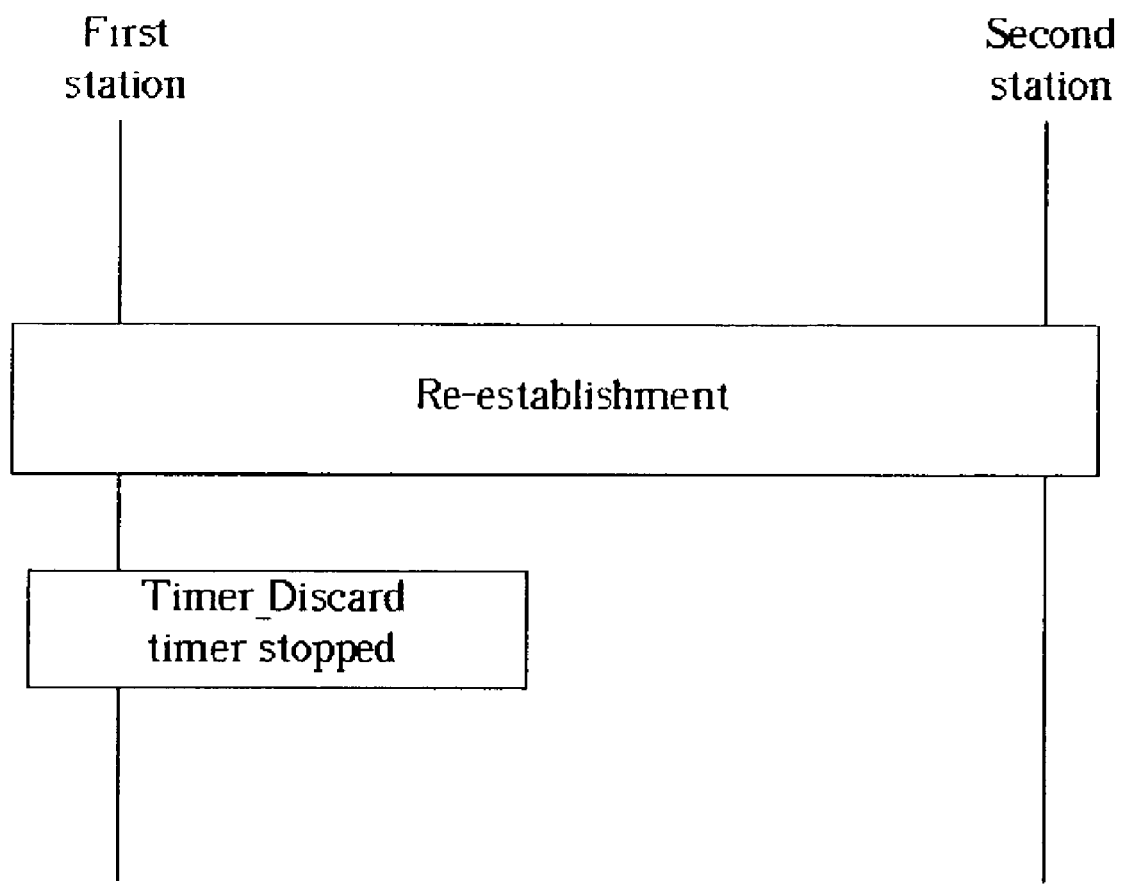
FIG. 12 is a message sequence chart illustrating handling of the Timer_Discard timer during a re-establishment function according to the present invention.

Please refer to FIG. 12. FIG. 12 is a message sequence chart illustrating handling of the Timer_Discard timer during a re-establishment function according to the present invention. After the RLC AM entity 14 is re-established by upper layers, the present invention method includes stopping the Timer_Discard timer since all corresponding SDUs will be discarded.

Figure 13:
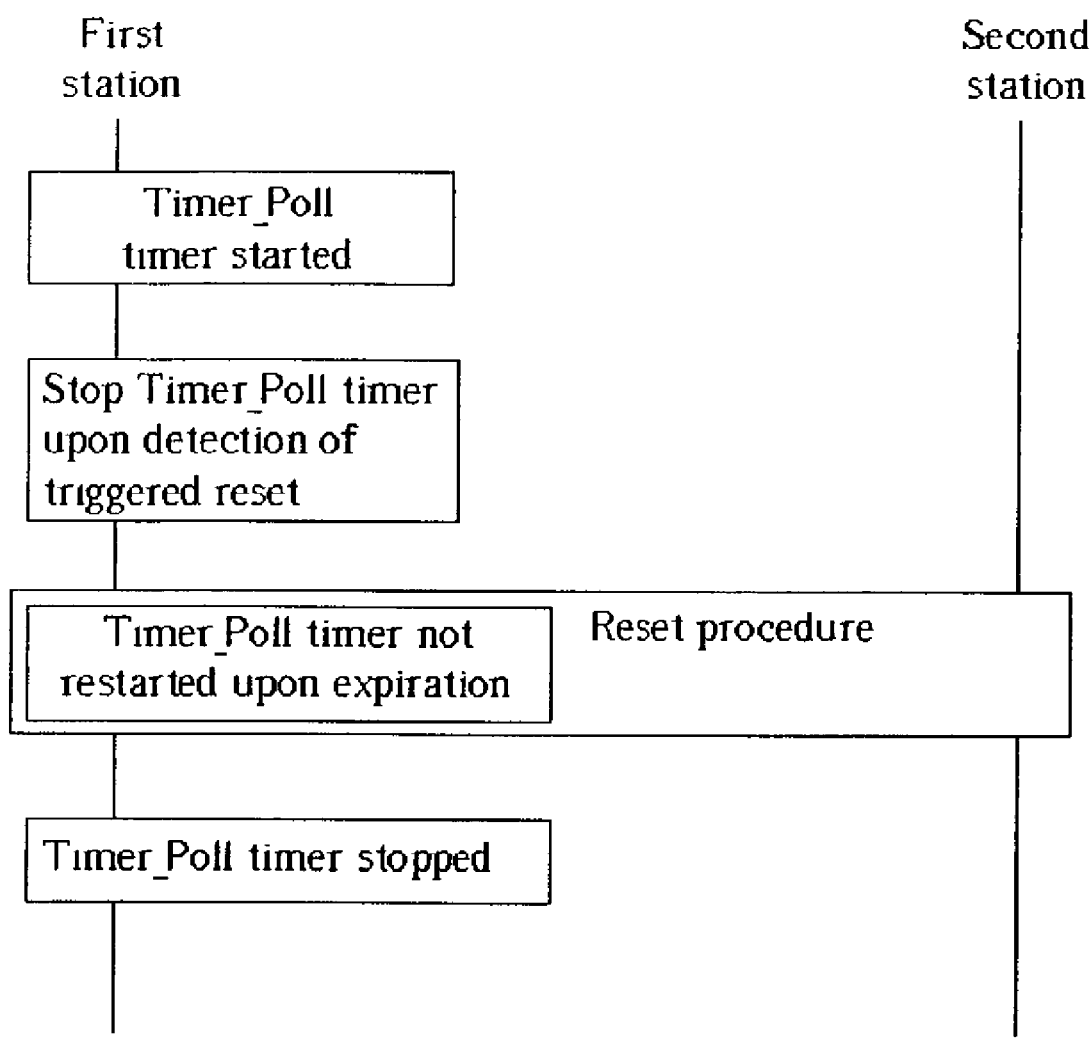
FIG. 13 is a message sequence chart illustrating handling of the Timer_Poll timer during a reset procedure according to the present invention.

Please refer to FIG. 13. FIG. 13 is a message sequence chart illustrating handling of the Timer_Poll timer during a reset procedure according to the present invention. First of all, the Timer_Poll timer is started for the RLC AM entity 14 when a poll is sent by the RLC AM entity 14. Next, if the RLC AM entity 14 is triggered to send a RESET PDU to the RLC AM entity 24, the present method invention includes stopping the Timer_Poll timer. After that, the RLC AM entity 14 begins a reset procedure by sending a RESET PDU to the RLC AM entity 24 of the second station 20. When the RLC AM entity 14 has already transmitted a RESET PDU to the RLC AM entity 24 and has not yet received acknowledgement in the form of a RESET ACK PDU, if the Timer_Poll timer expires, the present method invention includes not restarting the Timer_Poll timer. The reset procedure is then concluded when the RLC AM entity 14 receives a RESET ACK PDU. Upon reception of this RESET ACK PDU, the present invention method includes stopping the Timer_Poll timer. On the other hand, suppose the RLC AM entity 24 of the second station 20 is also running a Timer_Poll timer. When the RLC AM entity 24 receives the RESET PDU to begin the reset procedure, the present invention method includes stopping the Timer_Poll timer.

The following explains why the present invention stops the Timer_Poll timer in a reset procedure. In general, if an RLC AM entity wants to know the status of which PDUs have been received correctly from its peer RLC AM entity, the RLC AM entity transmits a poll to request that the peer-RLC AM entity transmit a STATUS PDU containing this information. However, after a reset, an RLC AM entity discards all RLC SDUs that were transmitted before the reset in the transmitting side of the RLC AM entity, discards all RLC PDUs in the receiving side of the RLC AM entity, and resets all protocol states and protocol variables. Because the state of an RLC AM entity after a reset is like the initial state after the RLC AM entity is established, the Timer_Poll should be stopped.

Thus, for a reset procedure, the handling of the Timer_Poll timer can be summarized as follows: if the condition for triggering a reset procedure is detected, the Timer_Poll timer is stopped; when a RESET PDU has already been transmitted and not yet been acknowledged by a RESET ACK PDU, if the Timer_Poll timer expires, the timer Timer_Poll timer is not restarted; and upon reception of a RESET PDU or RESET ACK PDU, the Timer_Poll timer is stopped. Please note that the Timer_Poll timer can be stopped when the condition for triggering the reset was detected, or upon reception of the RESET PDU or RESET ACK PDU. By stopping the Timer_Poll timer after a reset procedure, the state of the RLC AM entity after a reset will be like the initial state of the RLC AM entity after it was established.

Figure 14:
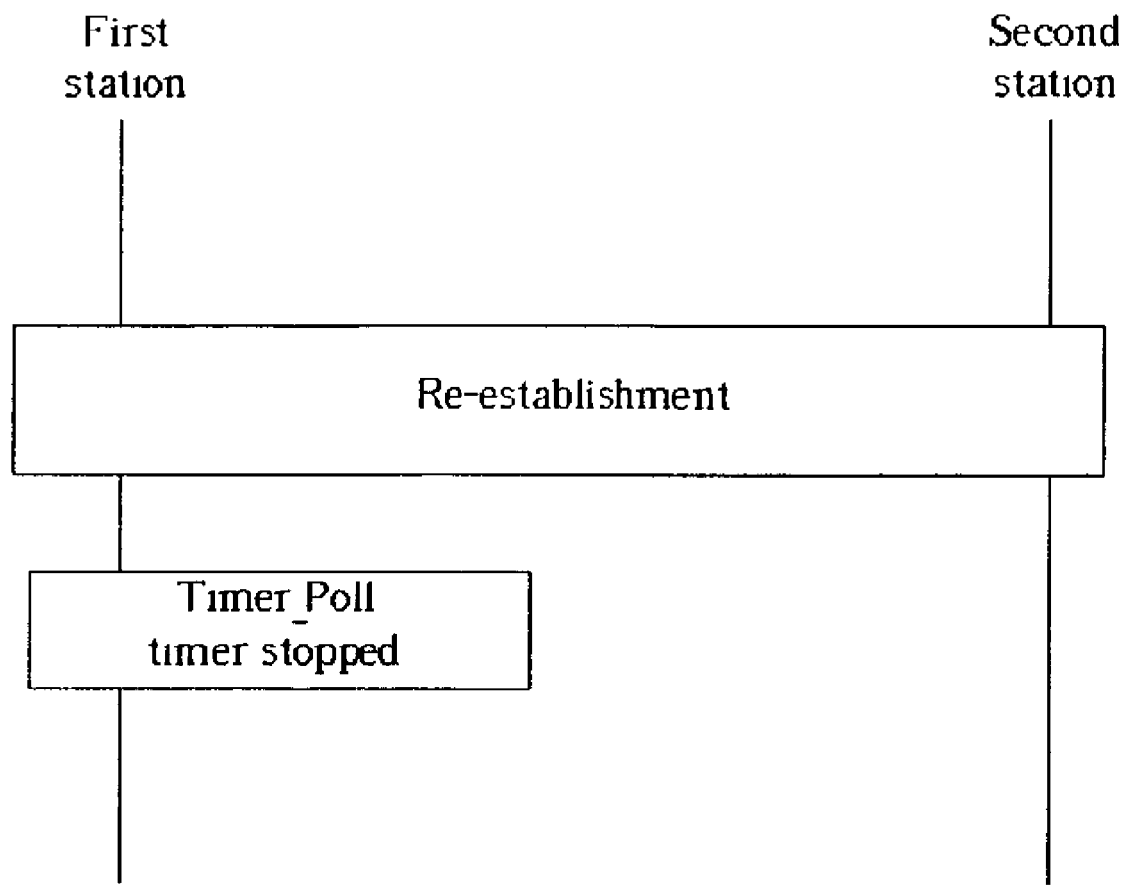
FIG. 14 is a message sequence chart illustrating handling of the Timer_Poll timer during a re-establishment function according to the present invention.

Please refer to FIG. 14. FIG. 14 is a message sequence chart illustrating handling of the Timer_Poll timer during a re-establishment function according to the present invention. After the RLC AM entity 14 is re-established by upper layers, the present invention method includes stopping the Timer_Poll timer for the same reason just given above: the state of the RLC AM entity after re-establishment should be like the initial state of the RLC AM entity after it was established.

Figure 15:
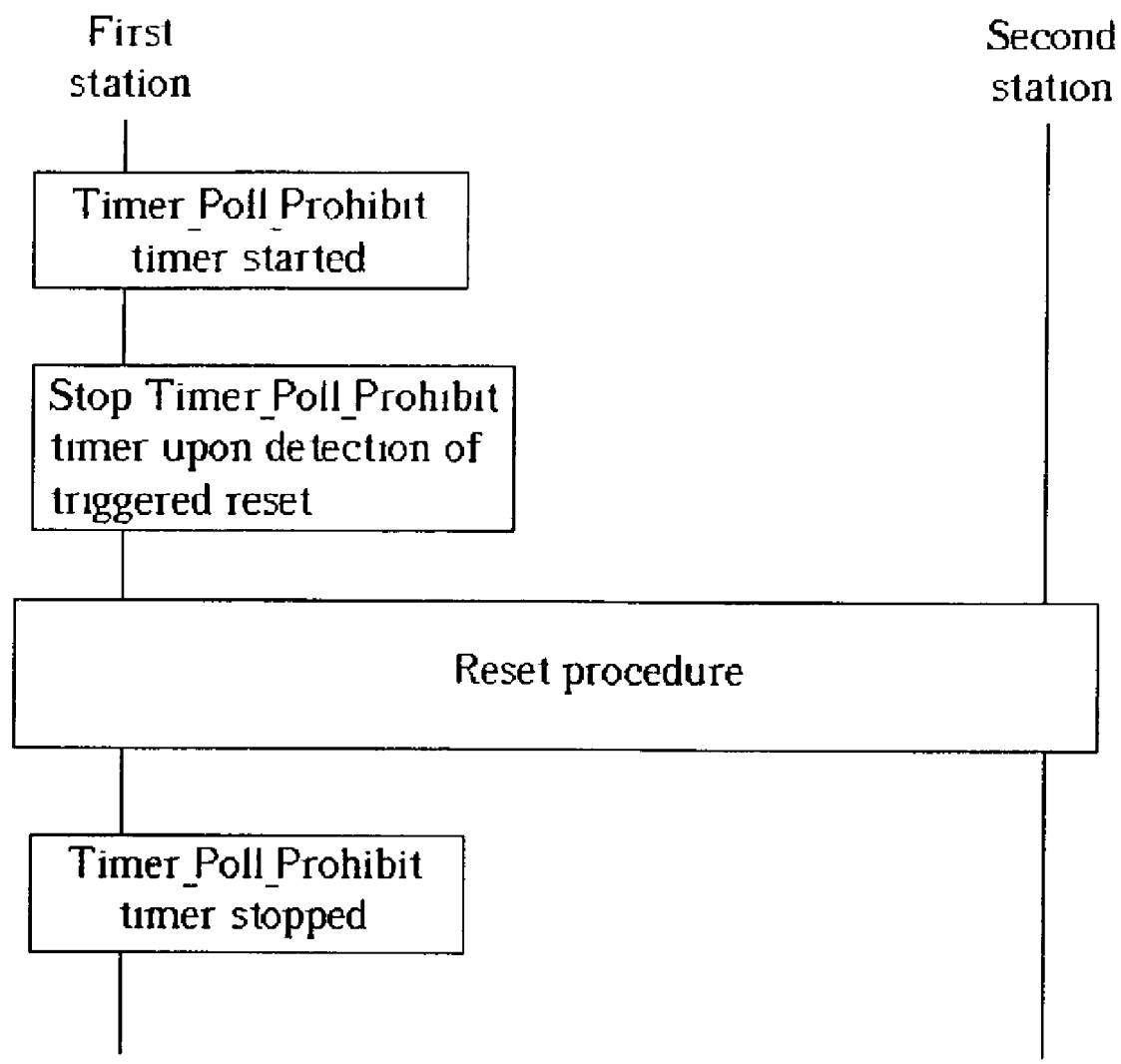
FIG. 15 is a message sequence chart illustrating handling of the Timer_Poll_Prohibit timer during a reset procedure according to the present invention.

Please refer to FIG. 15. FIG. 15 is a message sequence chart illustrating handling of the Timer_Poll_Prohibit timer during a reset procedure according to the present invention. First of all, the Timer_Poll_Prohibit timer is started by the RLC AM entity 14 when a poll is sent. If another poll is triggered while polling is prohibited, its transmission is delayed until the timer expires. Next, if the RLC AM entity 14 is triggered to send a RESET PDU to the RLC AM entity 24, the present method invention includes stopping the Timer_Poll_Prohibit timer. After that, the RLC AM entity 14 begins a reset procedure by sending a RESET PDU to the RLC AM entity 24 of the second station 20. The reset procedure is then concluded when the RLC AM entity 14 receives a RESET ACK PDU. Upon reception of this RESET ACK PDU, the present invention method includes stopping the Timer_Poll_Prohibit timer. On the other hand, suppose the RLC AM entity 24 of the second station 20 is also running a Timer_Poll_Prohibit timer. When the RLC AM entity 24 receives the RESET PDU to begin the reset procedure, the present invention method includes stopping the Timer_Poll_Prohibit timer. The Timer_Poll_Prohibit timer is stopped so that the state of the RLC AM entity after a reset will be like the initial state of the RLC AM entity after it was established.

Thus, for a reset procedure, the handling of the Timer_Poll_Prohibit timer can be summarized as follows: if the condition for triggering a reset procedure is detected, the Timer_Poll_Prohibit timer is stopped; and upon reception of a RESET PDU or RESET ACK PDU, the Timer_Poll_Prohibit timer is stopped. Please note that the Timer_Poll_Prohibit timer can be stopped when the condition for triggering the reset was detected, or upon reception of the RESET PDU or RESET ACK PDU. By stopping the Timer_Poll_Prohibit timer after a reset procedure, the state of the RLC AM entity after a reset will be like the initial state of the RLC AM entity after it was established.

Figure 16:
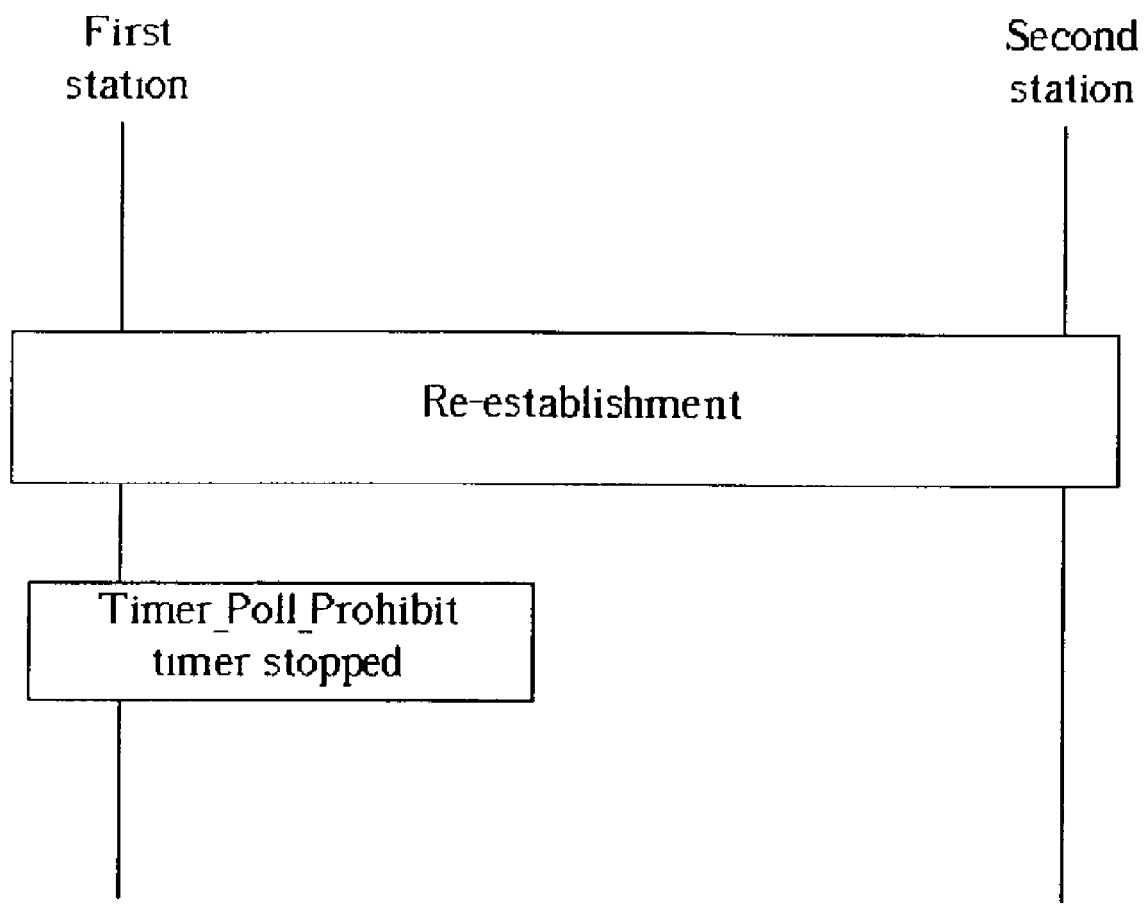
FIG. 16 is a message sequence chart illustrating handling of the Timer_Poll_Prohibit timer during a re-establishment function according to the present invention.

Please refer to FIG. 16. FIG. 16 is a message sequence chart illustrating handling of the Timer_Poll_Prohibit timer during a re-establishment function according to the present invention. After the RLC AM entity 14 is re-established by upper layers, the present invention method includes stopping the Timer_Poll_Prohibit timer for the same reason just given above: the state of the RLC AM entity after re-establishment should be like the initial state of the RLC AM entity after it was established.

Figure 17:
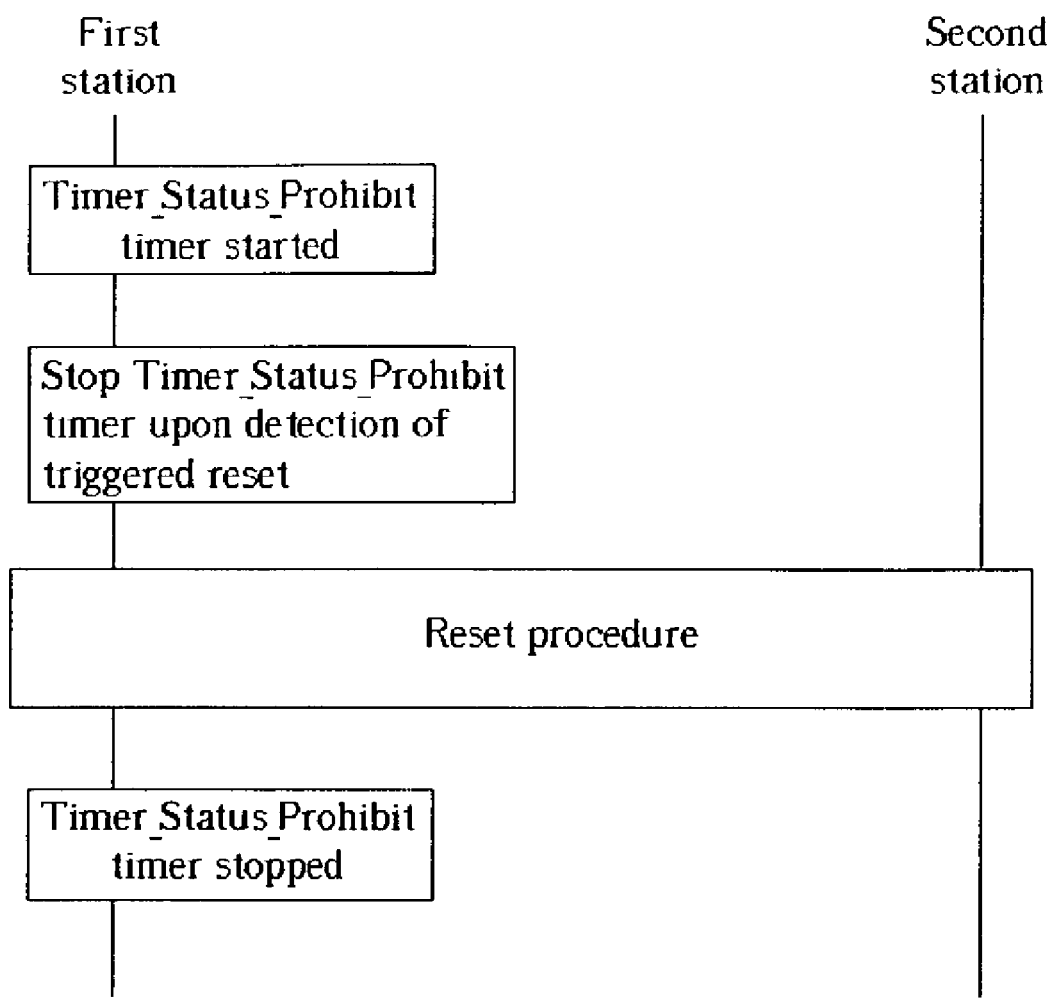
FIG. 17 is a message sequence chart illustrating handling of the Timer_Status_Prohibit timer during a reset procedure according to the present invention.

Please refer to FIG. 17. FIG. 17 is a message sequence chart illustrating handling of the Timer_Status_Prohibit timer during a reset procedure according to the present invention. First of all, the Timer_Status Prohibit timer is started for the RLC AM entity 14 by upper layers. Next, if the RLC AM entity 14 is triggered to send a RESET PDU to the RLC AM entity 24, the present method invention includes stopping the Timer_Status_Prohibit timer. After that, the RLC AM entity 14 begins a reset procedure by sending a RESET PDU to the RLC AM entity 24 of the second station 20. The reset procedure is then concluded when the RLC AM entity 14 receives a RESET ACK PDU. Upon reception of this RESET ACK PDU, the present invention method includes stopping the Timer_Status_Prohibit timer. On the other hand, suppose the RLC AM entity 24 of the second station 20 is also running a Timer_Status_Prohibit timer. When the RLC AM entity 24 receives the RESET PDU to begin the reset procedure, the invention method includes stopping the Timer_Status_Prohibit timer. The Timer_Status_Prohibit timer is stopped so that the state of the RLC AM entity after a reset will be like the initial state of the RLC AM entity after it was established.

Thus, for a reset procedure, the handling of the Timer_Status_Prohibit timer can be summarized as follows: if the condition for triggering a reset procedure is detected, the Timer_Status_Prohibit timer is stopped; and upon reception of a RESET PDU or RESET ACK PDU, the Timer_Status_Prohibit timer is stopped. Please note that the Timer_Status_Prohibit timer can be stopped when the condition for triggering the reset was detected, or upon reception of the RESET PDU or RESET ACK PDU. By stopping the Timer_Status_Prohibit timer after a reset procedure, the state of the RLC AM entity after a reset will be like the initial state of the RLC AM entity after it was established.

Figure 18:
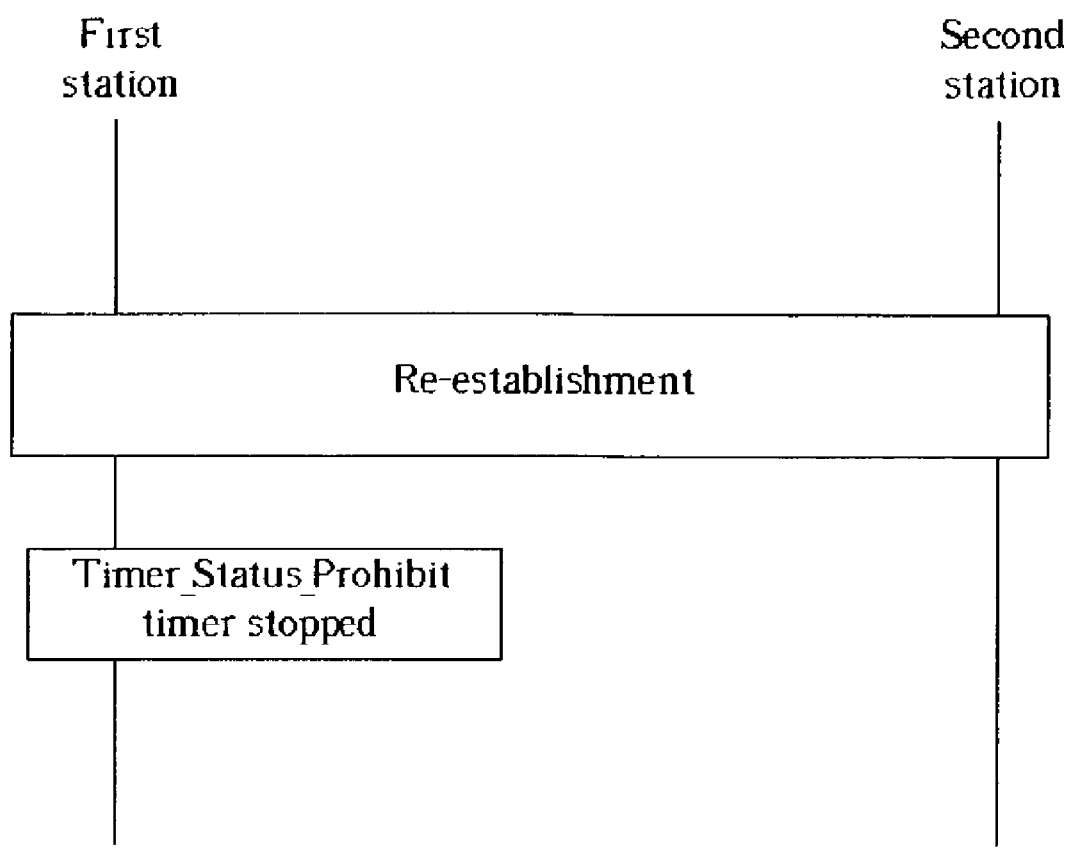
FIG. 18 is a message sequence chart illustrating handling of the Timer_Status_Prohibit timer during a re-establishment function according to the present invention.

Please refer to FIG. 18. FIG. 18 is a message sequence chart illustrating handling of the Timer_Status_Prohibit timer during a re-establishment function according to the present invention. After the RLC AM entity 14 is re-established by upper layers, the present invention method includes stopping the Timer_Status_Prohibit timer for the same reason just given above: the state of the RLC AM entity after re-establishment should be like the initial state of the RLC AM entity after it was established.

Figure 19:
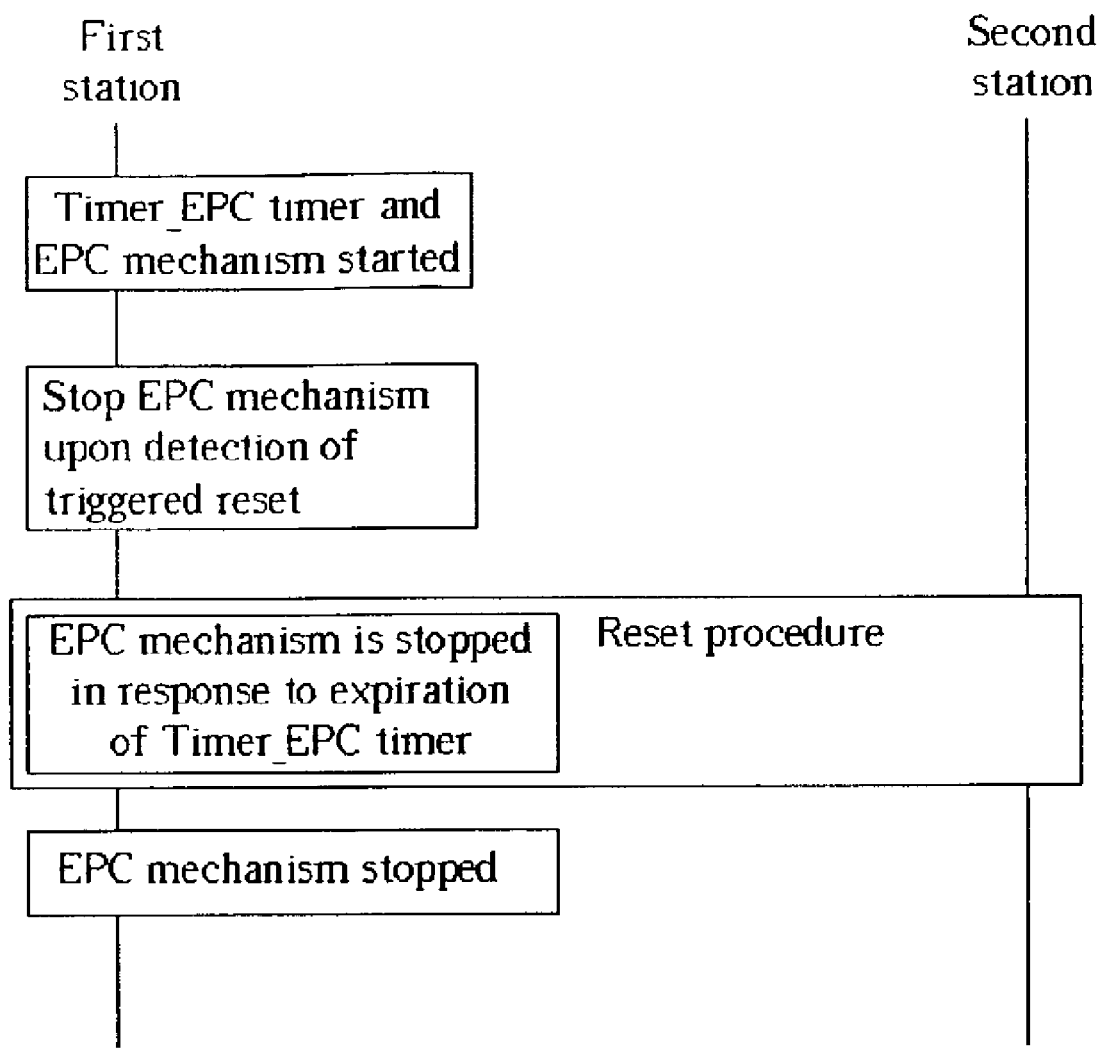
FIG. 19 is a message sequence chart illustrating handling of the Timer_EPC timer and an Estimated PDU Counter (EPC) mechanism during a reset procedure according to the present invention.

Please refer to FIG. 19. FIG. 19 is a message sequence chart illustrating handling of the Timer_EPC timer and an Estimated PDU Counter (EPC) mechanism during a reset procedure according to the present invention. The Timer_EPC timer is meant to account for roundtrip delay, i.e. the time between the transmission of a status report and the reception of the first retransmitted AMD PDU. The EPC mechanism is used to request that transmitter in the peer RLC AM entity retransmit AMD PDUs indicated in a STATUS PDU.

First of all, the Timer_EPC timer and EPC mechanism are started for the RLC AM entity 14 when a first STATUS PDU of a status report is sent by the RLC AM entity 14. Next, if the RLC AM entity 14 is triggered to send a RESET PDU to the RLC AM entity 24, the present method invention includes stopping the EPC mechanism. After that, the RLC AM entity 14 begins a reset procedure by sending a RESET PDU to the RLC AM entity 24 of the second station 20. When the RLC AM entity 14 has already transmitted a RESET PDU to the RLC AM entity 24 and has not yet received acknowledgement in the form of a RESET ACK PDU, if the Timer_EPC timer expires, the present method invention includes stopping the EPC mechanism. The reset procedure is then concluded when the RLC AM entity 14 receives a RESET ACK PDU. Upon reception of this RESET ACK PDU, the present invention method includes stopping the EPC mechanism. On the other hand, suppose the RLC AM entity 24 of the second station 20 is also running a Timer_EPC timer and EPC mechanism. When the RLC AM entity 24 receives the RESET PDU to begin the reset procedure, the present invention method includes stopping the EPC mechanism. Because the state of the RLC AM entity after a reset is like the initial state of the RLC AM entity after establishment, EPC mechanism should be stopped.

Thus, for a reset procedure, the handling of the Timer_EPC timer and EPC mechanism can be summarized as follows: if the condition for triggering a reset procedure is detected, the EPC mechanism is stopped; when a RESET PDU has already been transmitted and not yet been acknowledged by a RESET ACK PDU, if the Timer_EPC timer expires, the EPC mechanism is stopped; and upon reception of a RESET PDU or RESET ACK PDU, the EPC mechanism is stopped. Please note that the EPC mechanism can be stopped when the condition for triggering the reset was detected, or upon reception of the RESET PDU or RESET ACK PDU. By stopping the EPC mechanism after a reset procedure, the state of the RLC AM entity after a reset will be like the initial state of the RLC AM entity after it was established.

Figure 20:
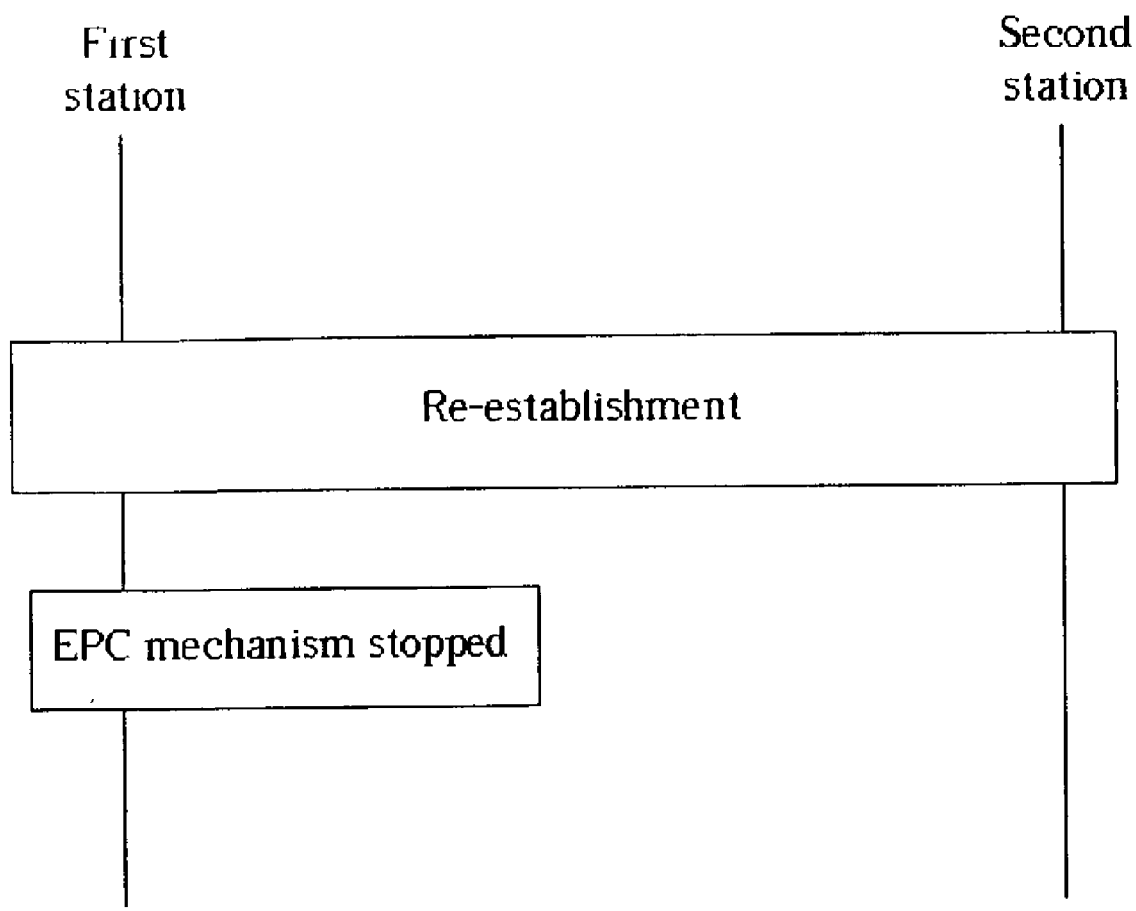
FIG. 20 is a message sequence chart illustrating handling of the EPC mechanism during a re-establishment function according to the present invention.

Please refer to FIG. 20. FIG. 20 is a message sequence chart illustrating handling of the EPC mechanism during a re-establishment function according to the present invention. After the RLC AM entity 14 is re-established by upper layers, the present invention method includes stopping the EPC mechanism for the same reason just given above: the state of the RLC AM entity after re-establishment should be like the initial state of the RLC AM entity after it was established.

Figure 21:
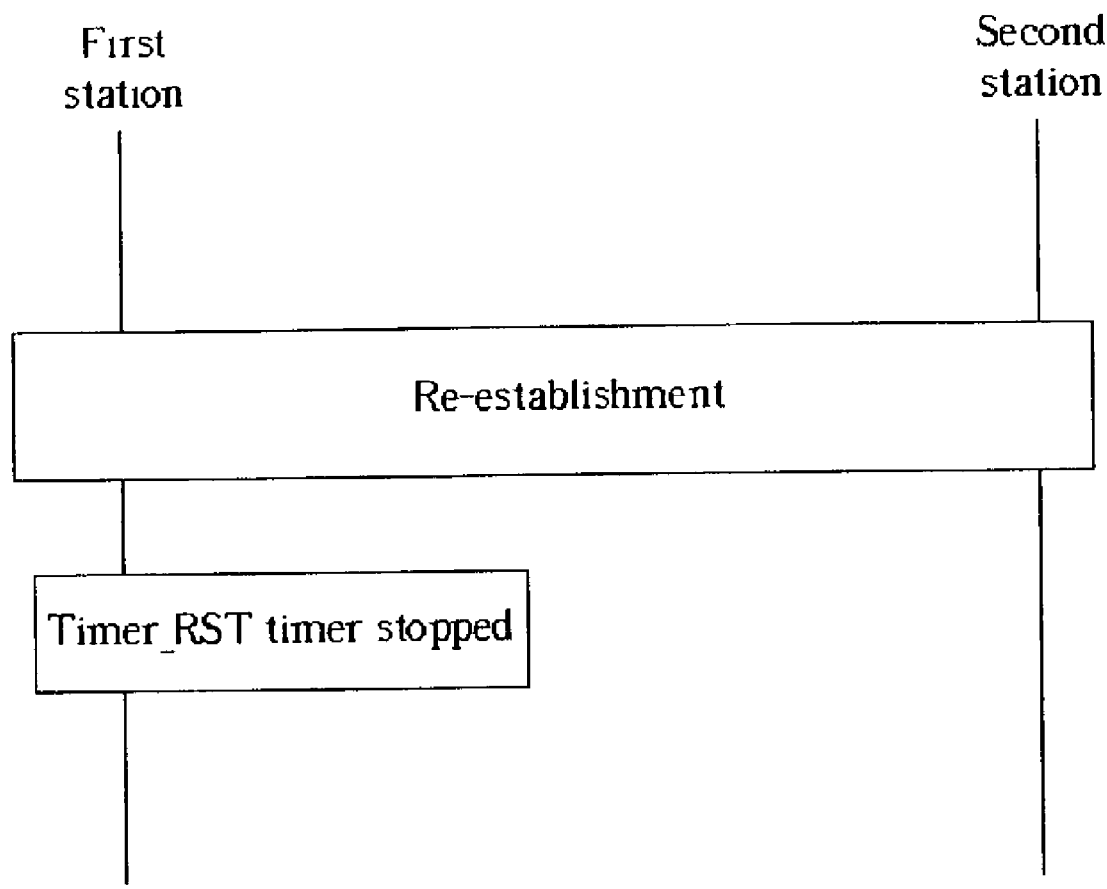
FIG. 21 is a message sequence chart illustrating handling of the Timer_RST timer during a re-establishment function according to the present invention.

Please refer to FIG. 21. FIG. 21 is a message sequence chart illustrating handling of the Timer_RST timer during a re-establishment function according to the present invention. After the RLC AM entity 14 is re-established by upper layers, the present invention method includes stopping the Timer_RST timer so that the state of the RLC AM entity after re-establishment will be like the initial state of the RLC AM entity after it was established.

Figure 22:
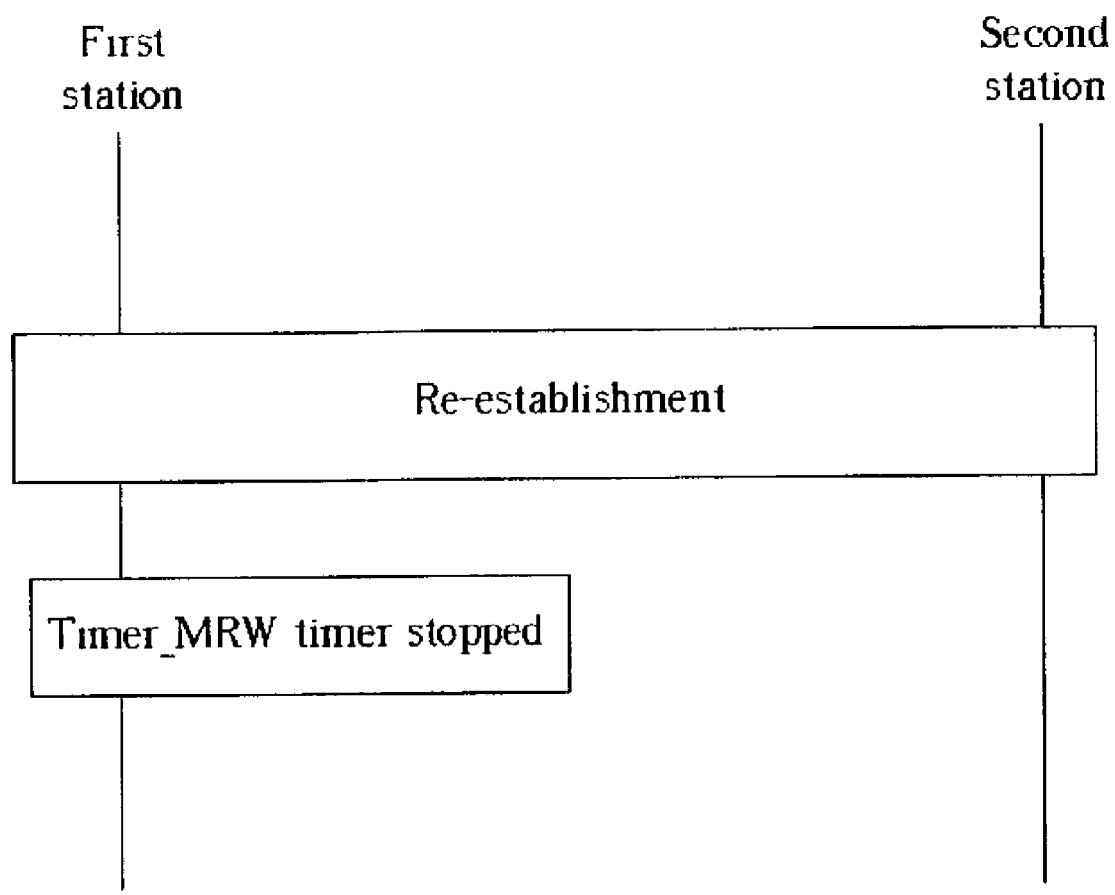
FIG. 22 is a message sequence chart illustrating handling of the Timer_MRW timer during a re-establishment function according to the present invention.

Please refer to FIG. 22. FIG. 22 is a message sequence chart illustrating handling of the Timer_MRW timer during a re-establishment function according to the present invention. After the RLC AM entity 14 is re-established by upper layers, the present invention method includes stopping the Timer_MRWtimer so that the state of the RLC AM entity after re-establishment will be like the initial state of the RLC AM entity after it was established.

Compared to the prior art, the present invention provides steps for handling nine timers before, during, and after a reset procedure, as well as after re-establishment. Therefore, the present invention fully describes how to handle the Timer_Poll, Timer_Poll_Prohibit, Timer_EPC, Timer_Discard, Timer_Poll_Periodic, Timer_Status_Prohibit, Timer_Status_Periodic, Timer_RST, and Timer_MRW timers. Thus, using the method specified in the present invention will prevent RLC AM entities from experiencing deadlock, and will help maintain the quality of service.

The invention claimed is:

1. A method for handling timers in a wireless communication system, the method comprising:
   starting a Timer_Poll_Periodic timer for a Radio Link Control Acknowledged Mode (RLC AM) entity;
   performing a reset procedure for the RLC AM entity; and
   restarting the Timer_Poll_Periodic timer in response to the Timer_Poll_Periodic timer expiring prior to completion of the reset procedure; and
   not stopping the Timer_Poll_Periodic timer after the reset procedure.

2. A method for handling timers in a wireless communication system, the method comprising:
   starting a Timer_Poll_Periodic timer for a Radio Link Control Acknowledged Mode (RLC AM) entity;
   performming a reset procedure for the RLC AM entity;
   restarting the Timer_Poll_Periodic timer in response to the Timer_Poll_Periodic timer expiring prior to completion of the reset procedure; and
   restarting the Timer_Poll_Periodic timer in response to the reset procedure.

3. The method of claim 1 further comprising maintaining a value of the Timer_Poll_Periodic timer and maintaining operation of the Timer_Poll_Periodic timer in response to the reset procedure.

* * * * *